(12) United States Patent
Dixon

(10) Patent No.: US 12,298,486 B2
(45) Date of Patent: May 13, 2025

(54) SCANNING MICROSCOPE USING A MOSAIC SCAN FILTER

(71) Applicant: Huron Technologies International Inc., St. Jacobs (CA)

(72) Inventor: Arthur Edward Dixon, Waterloo (CA)

(73) Assignee: Huron Technologies International Inc., St. Jacobs (CA)

( * ) Notice: Subject to any disclaimer, the term of this patent is extended or adjusted under 35 U.S.C. 154(b) by 402 days.

(21) Appl. No.: 16/328,644

(22) PCT Filed: Aug. 25, 2017

(86) PCT No.: PCT/CA2017/000196
§ 371 (c)(1),
(2) Date: Feb. 26, 2019

(87) PCT Pub. No.: WO2018/035597
PCT Pub. Date: Mar. 1, 2018

(65) Prior Publication Data
US 2021/0278648 A1    Sep. 9, 2021

Related U.S. Application Data

(60) Provisional application No. 62/550,278, filed on Aug. 25, 2017, provisional application No. 62/380,224, filed on Aug. 26, 2016.

(51) Int. Cl.
G02B 21/32    (2006.01)
G02B 5/20     (2006.01)
(Continued)

(52) U.S. Cl.
CPC ......... *G02B 21/0032* (2013.01); *G02B 5/201* (2013.01); *G02B 21/0076* (2013.01);
(Continued)

(58) Field of Classification Search
USPC .......................................................... 348/80
See application file for complete search history.

(56) References Cited

U.S. PATENT DOCUMENTS 9,575,304 B2 *   2/2017   Dixon ................. G02B 5/201
2007/0120785 A1* 5/2007   Kimura ............... G09G 3/3233
                                                   345/82
(Continued)

FOREIGN PATENT DOCUMENTS

JP    2004229222 A    8/2004

*Primary Examiner* — Mikhail Itskovich
(74) *Attorney, Agent, or Firm* — Smart & Biggar LP

(57) ABSTRACT

A mosaic scan filter array has a plurality of identical tiles, each tile have n rows and m columns where n is equal to a greater than 1 and m is equal to a greater than 2. One row of tiles extends a width of a detector array and constitutes a base pattern. The base pattern is repeated M times and each repetition is laterally offset in one direction by one pixel width. The base pattern and laterally offset repetitions constitute a repeat pattern. There are MxN filters selected from the group of one or more of the following: RGBW filters, fluorescence emission filters and a series of narrow spectral band filters covering a continuous spectral range. The mosaic scan filter arrays can be used with a scanning microscope or a scanning camera.

11 Claims, 22 Drawing Sheets

(51) Int. Cl.
  *G02B 21/00* (2006.01)
  *G02B 21/26* (2006.01)
  *G02B 21/36* (2006.01)
  *H04N 23/56* (2023.01)
  *H04N 23/84* (2023.01)
  *H04N 25/13* (2023.01)

(52) U.S. Cl.
  CPC ........... *G02B 21/26* (2013.01); *G02B 21/367* (2013.01); *H04N 23/56* (2023.01); *H04N 23/84* (2023.01); *H04N 25/13* (2023.01)

(56) References Cited

U.S. PATENT DOCUMENTS

2013/0342674 A1 12/2013 Dixon
2014/0240492 A1* 8/2014 Lee .................. H04N 25/53
  348/136
2015/0312493 A1 10/2015 Aldridge et al.

* cited by examiner

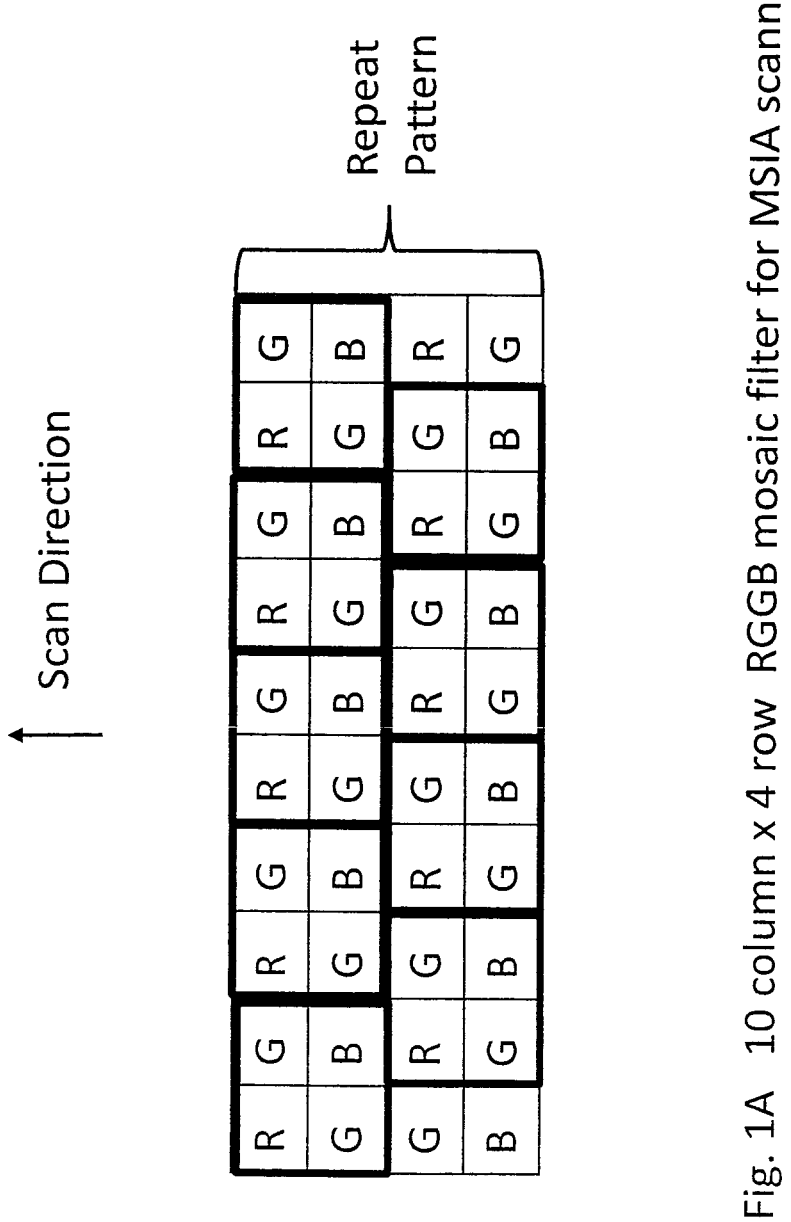
Fig. 1A  10 column x 4 row RGGB mosaic filter for MSIA scanning

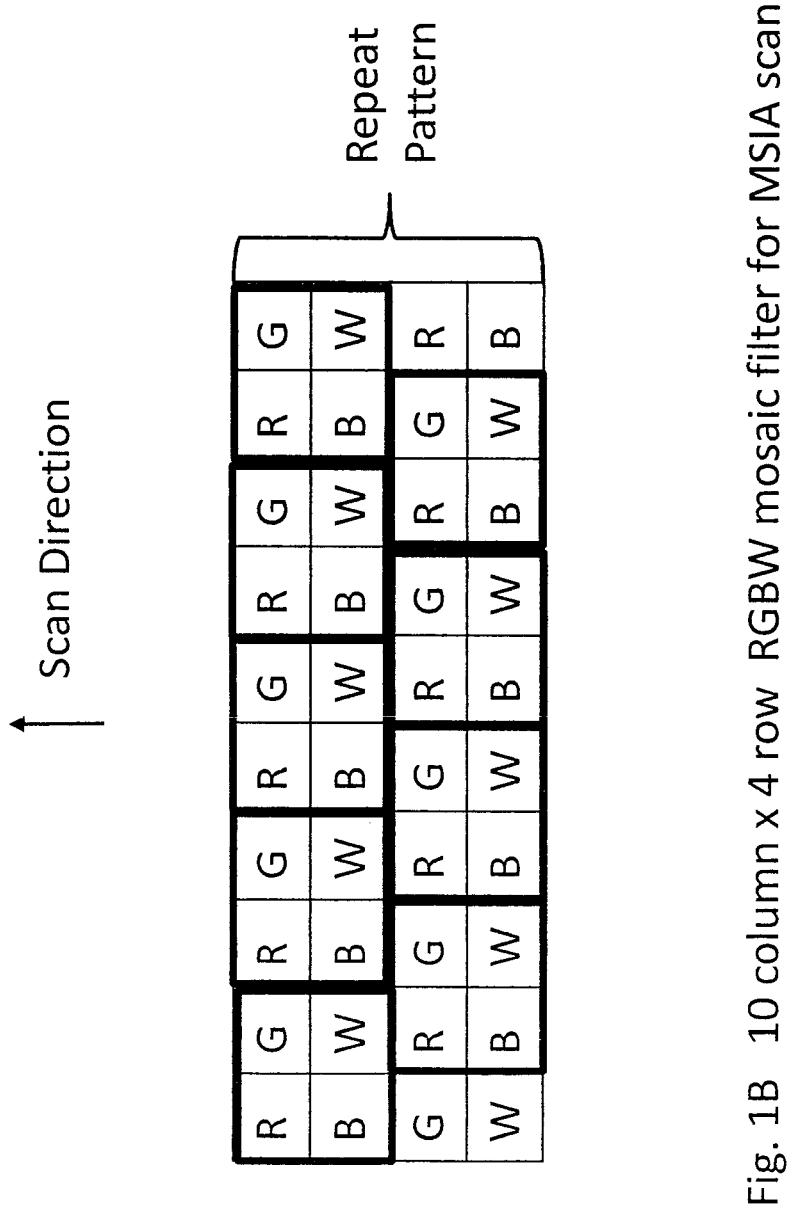
Fig. 1B   10 column x 4 row  RGBW mosaic filter for MSIA scanning

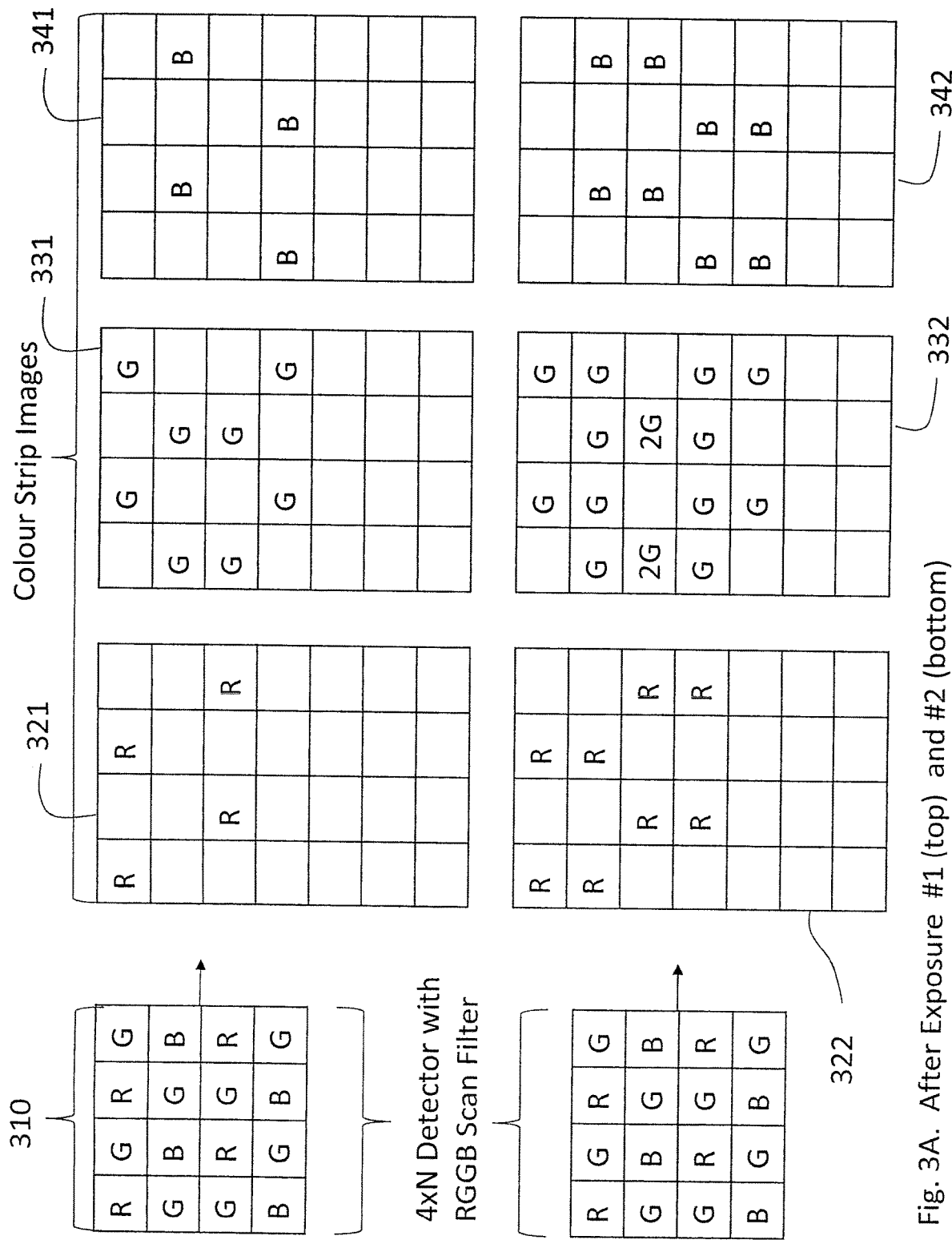
Fig. 3A. After Exposure #1 (top) and #2 (bottom)

Fig 3B After Exposure #3 (top) and #4 (bottom)

Fig. 3C After Exposure #5

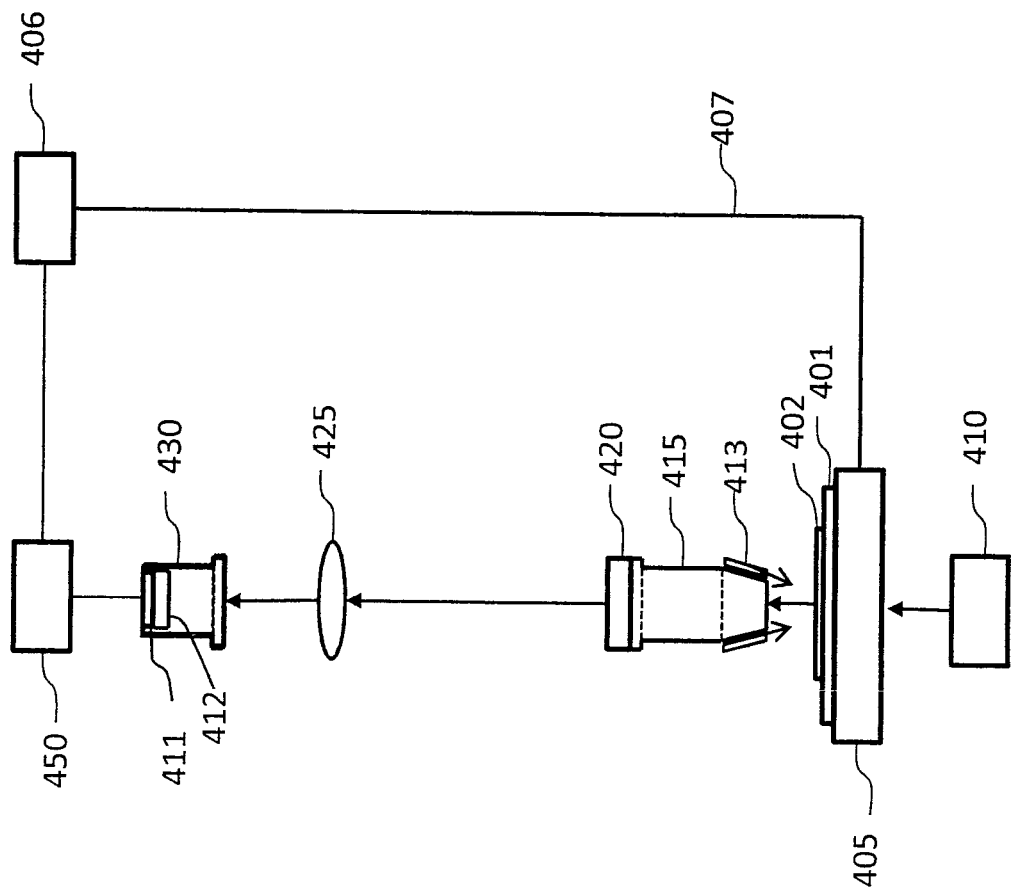
Fig. 4 MSIA scanner with a mosaic scan colour filter array

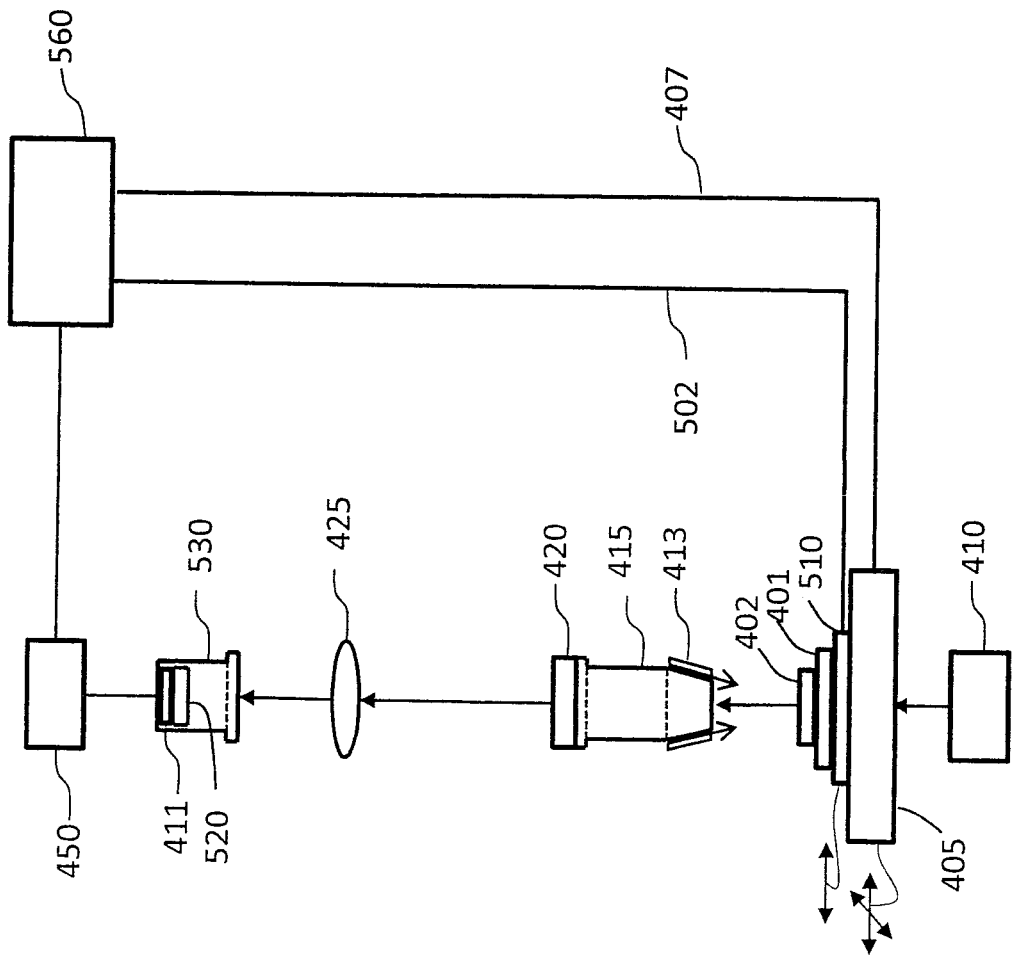
Fig. 5 Combination MSIA and FOV scanner

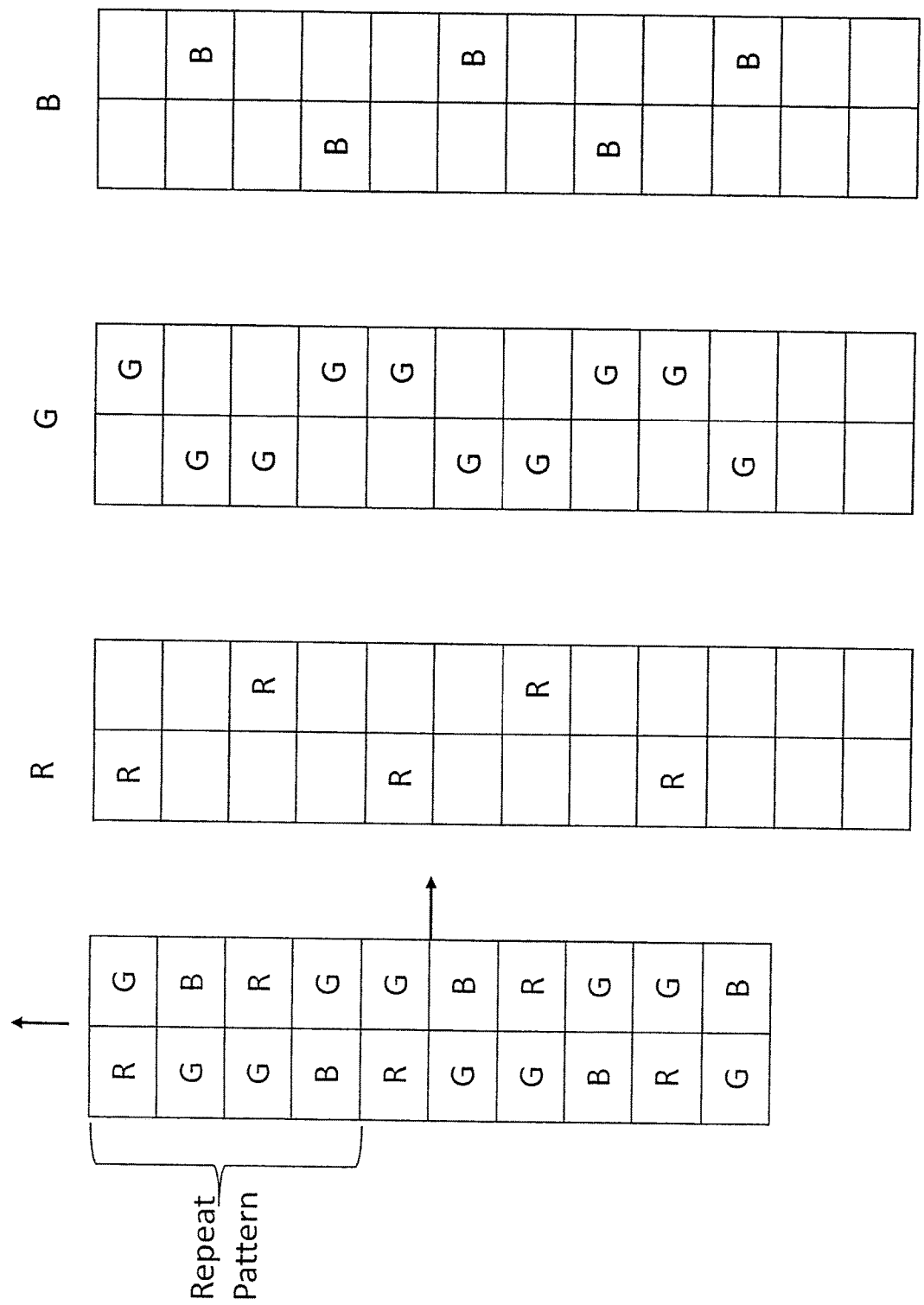
Fig. 6A  FOV Scanning, First Exposure

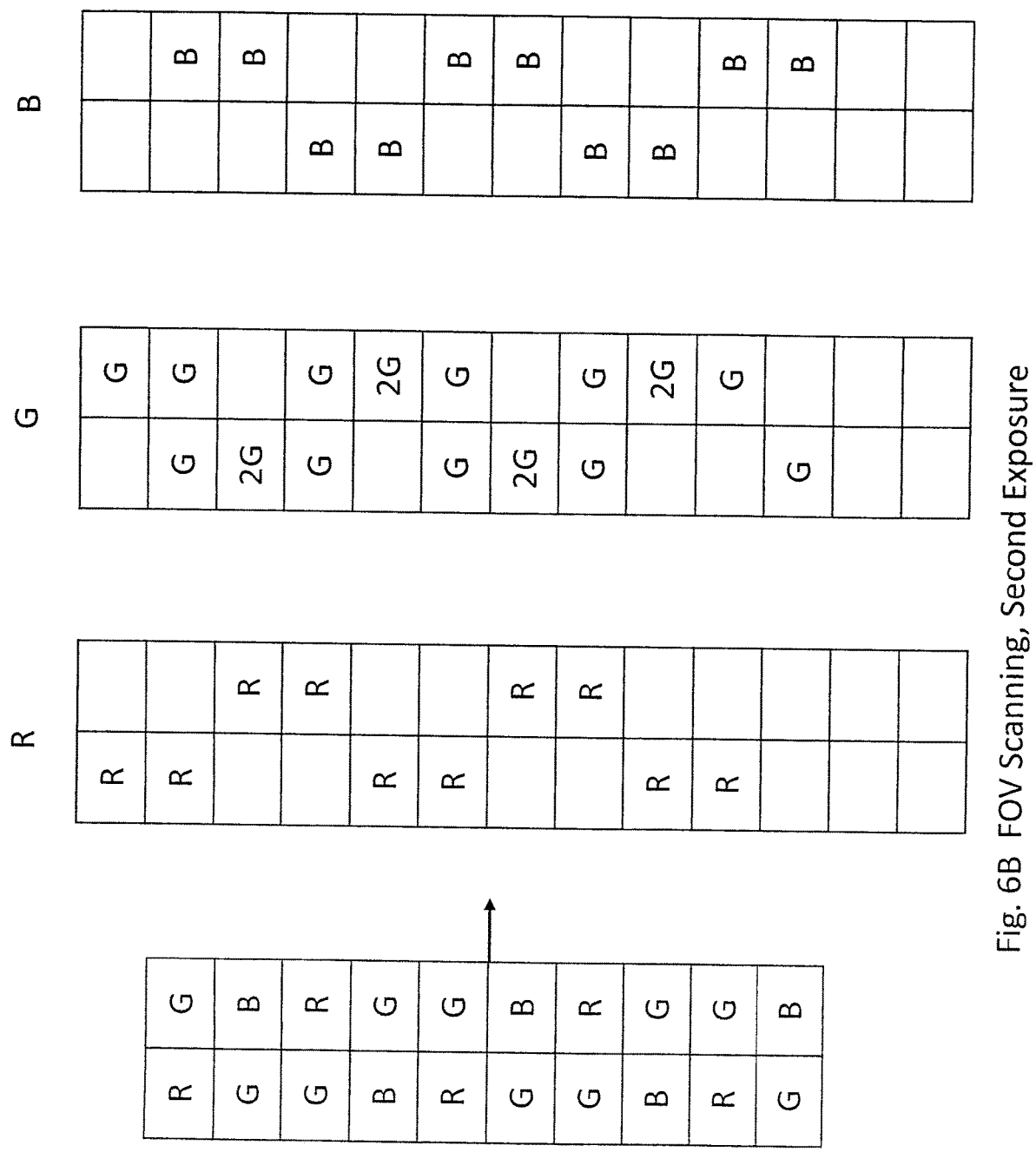
Fig. 6B FOV Scanning, Second Exposure

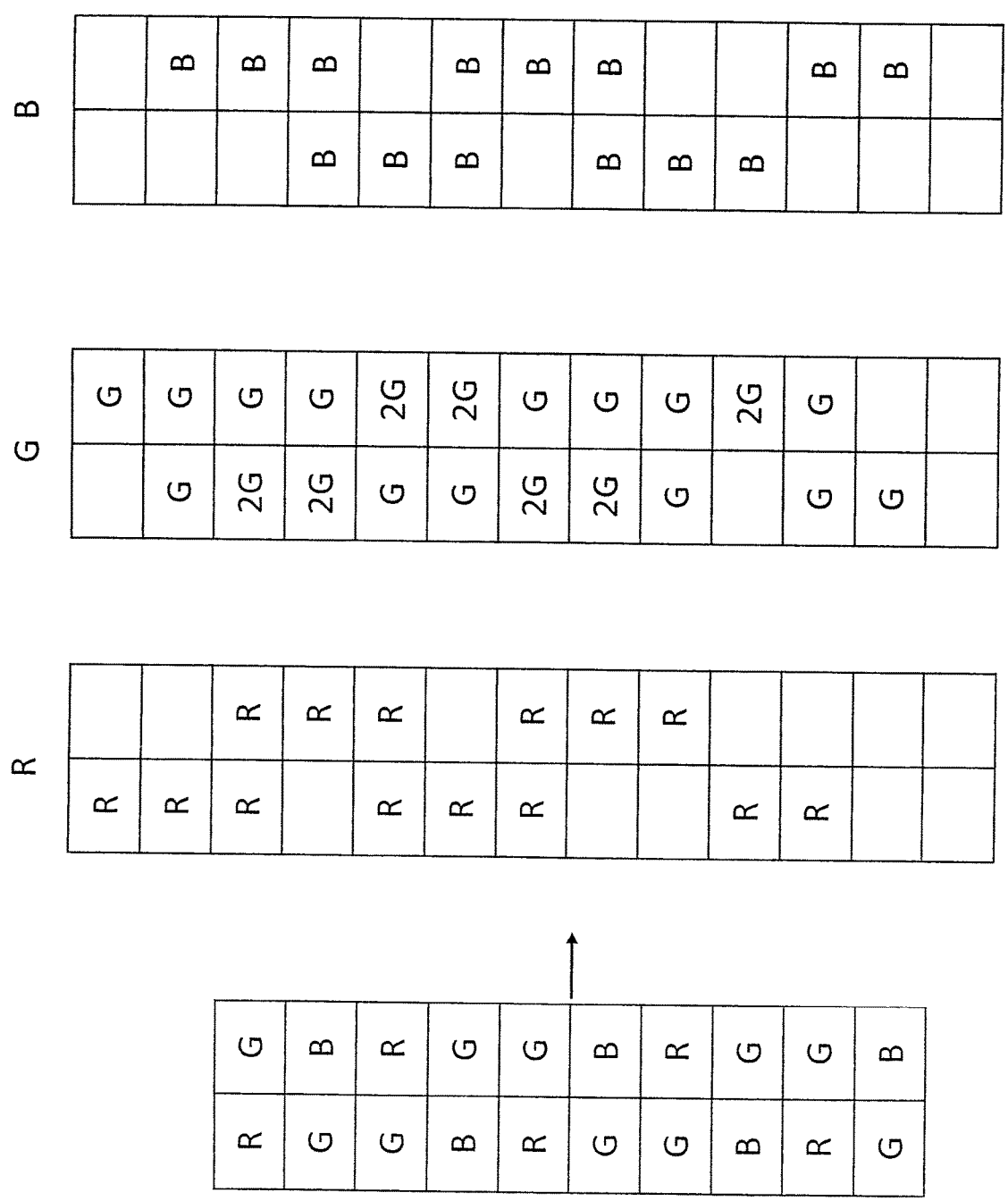
Fig. 6C  FOV Scanning, Third Exposure

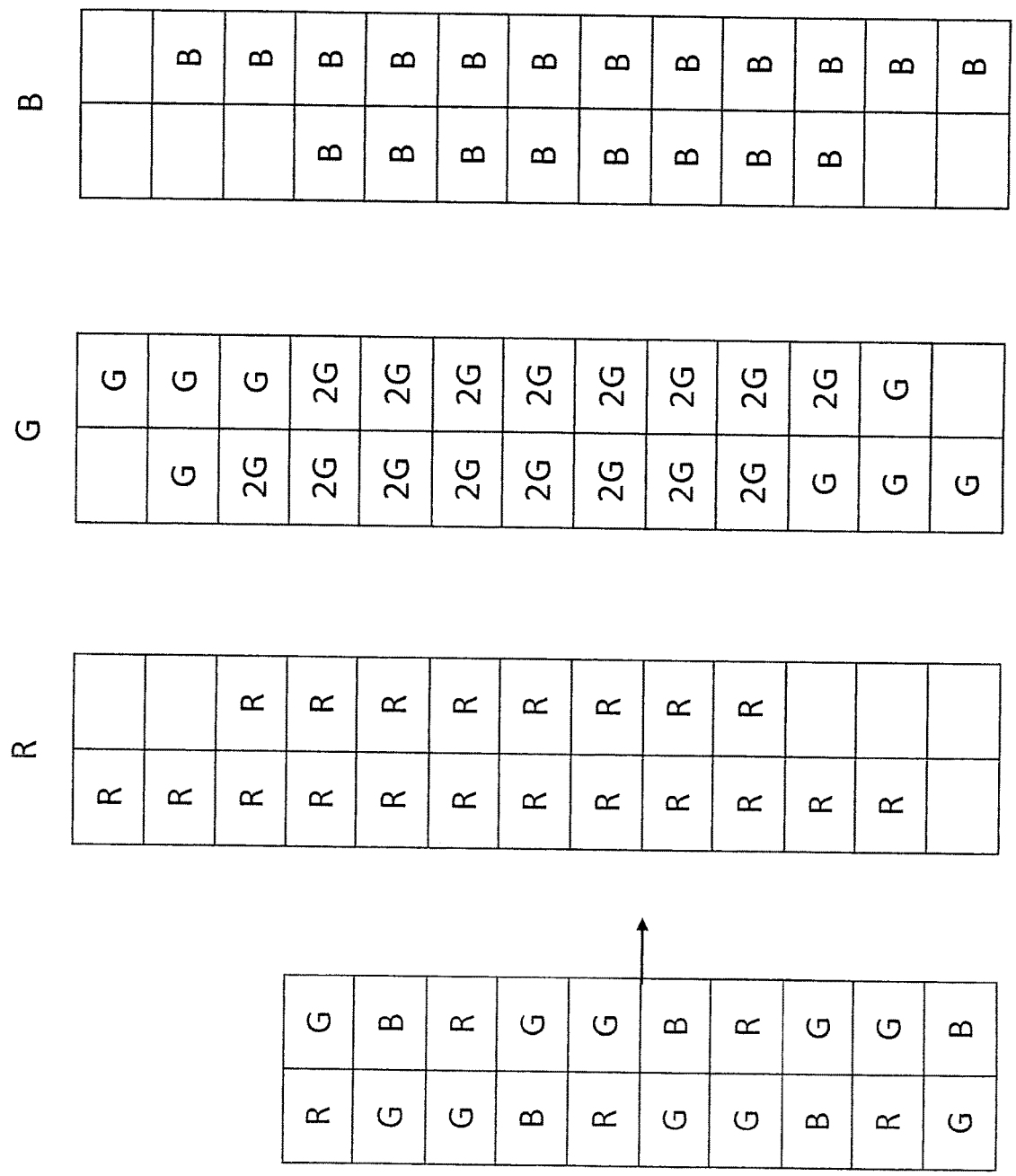
Fig. 6D  FOV Scanning, Fourth Exposure

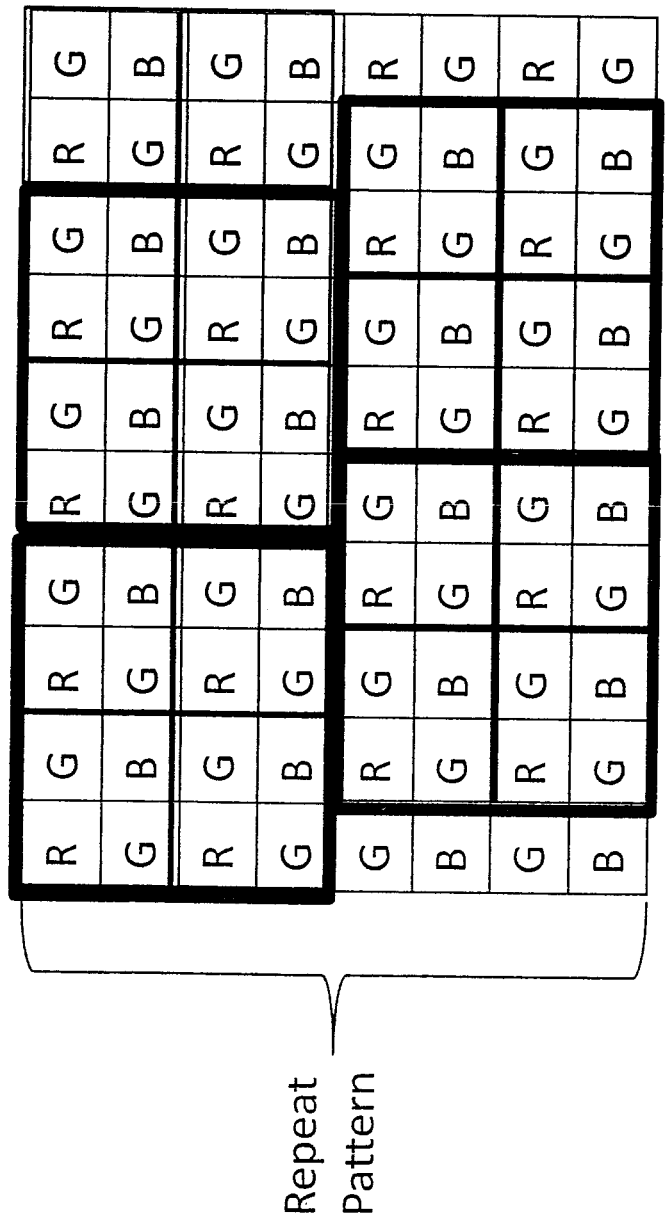
Fig. 7 Mosaic RGB Scan Filter Array with 4x4 pixel tiles

| F4 | F5 | F3 | F4 | F5 | F3 | F4 | F5 | F3 |
|----|----|----|----|----|----|----|----|----|
| R  | G  | B  | R  | G  | B  | R  | W  | B  |
| W  | F1 | F2 | W  | F1 | F2 | W  | F1 | F2 |
| F3 | F4 | F5 | F3 | F4 | F5 | F3 | F4 | F5 |
| B  | R  | G  | B  | R  | G  | B  | R  | G  |
| F2 | W  | F1 | F2 | W  | F1 | F2 | W  | F1 |
| F5 | F3 | F4 | F5 | F3 | F4 | F5 | F3 | F4 |
| G  | B  | R  | G  | B  | R  | G  | B  | R  |
| F1 | F2 | W  | F1 | F2 | W  | F1 | F2 | W  |
| F4 | F5 | F3 | F4 | F5 | F3 | F4 | F5 | F3 |
| R  | G  | B  | R  | G  | B  | R  | W  | B  |

Fig. 8A Mosaic Scan Filter Array for fluorescence and brightfield imaging comprised of three-row by three-column tiles

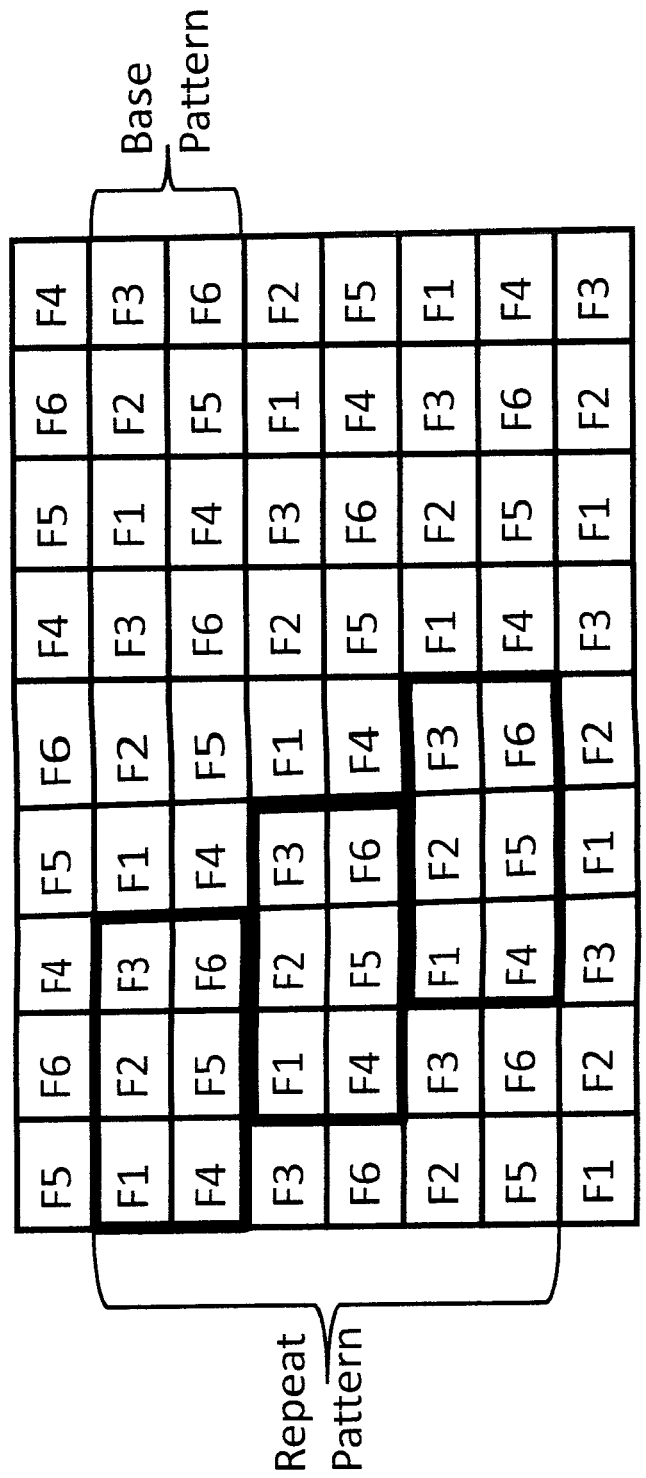
Fig. 8B Mosaic Scan Filter Array for fluorescence imaging of six fluorophores comprised of two-row by three-column tiles Fig. 8C Mosaic Scan Filter Array for fluorescence imaging of six fluorophores comprised of one-row by six-column tiles

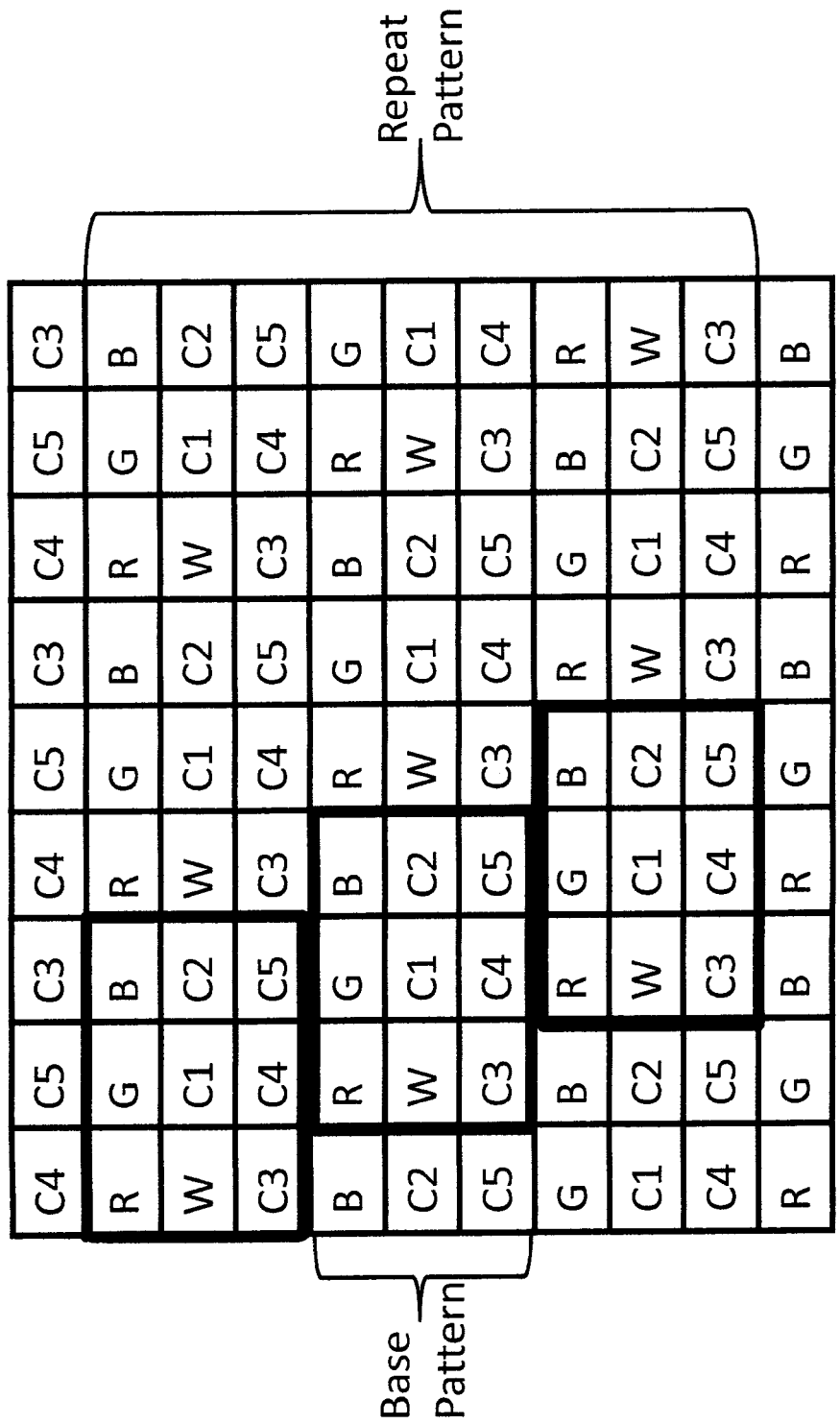
Fig. 9A Mosaic Scan Filter Array for brightfield and hyperspectral imaging comprised of three-row by three-column tiles Fig. 9B  Mosaic Scan Filter Array for hyperspectral imaging comprised of three-row by three-column tiles Fig. 9C Mosaic Scan Filter Array for hyperspectral imaging comprised of one-row by six-column tiles

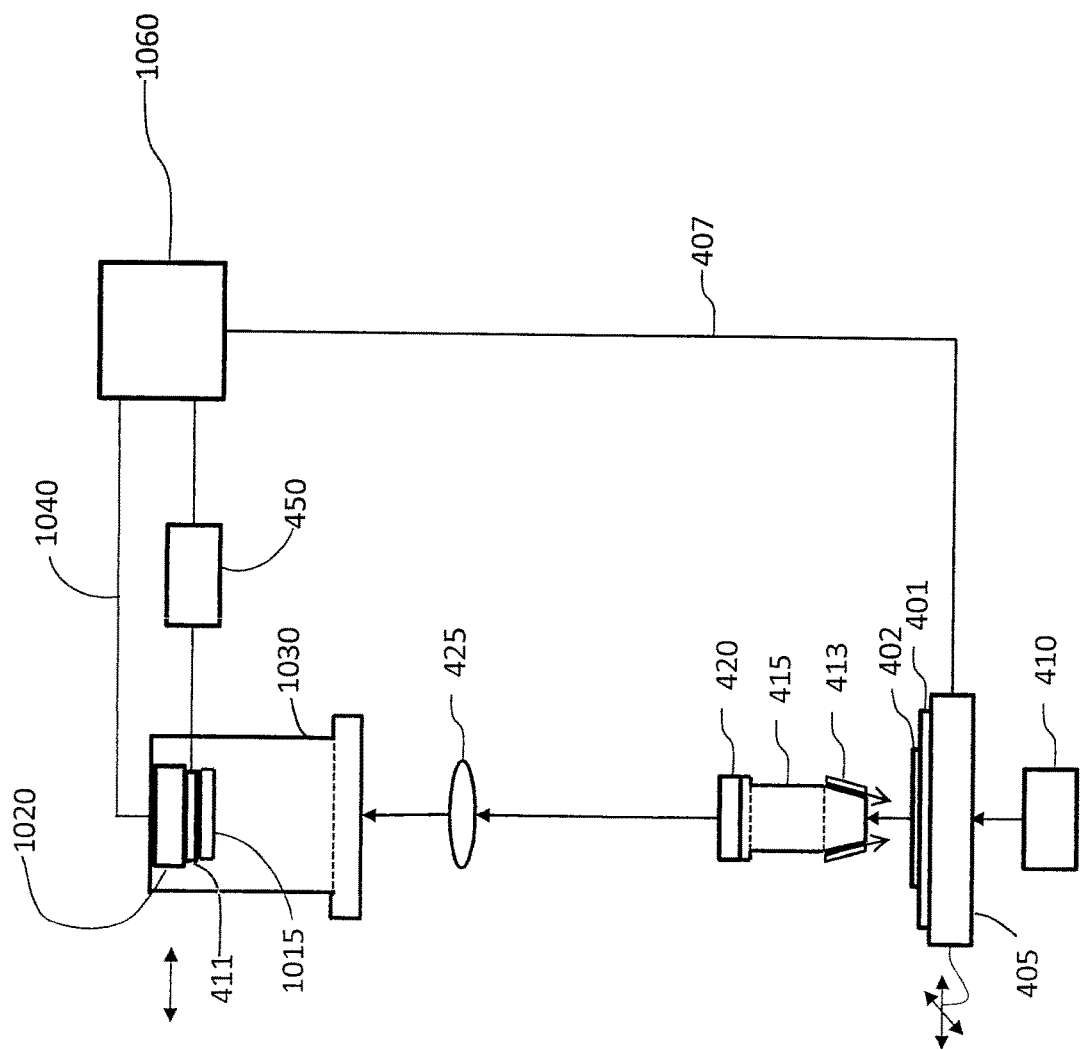
Fig.10 Combination MSIA and FOV scanner with scanning camera

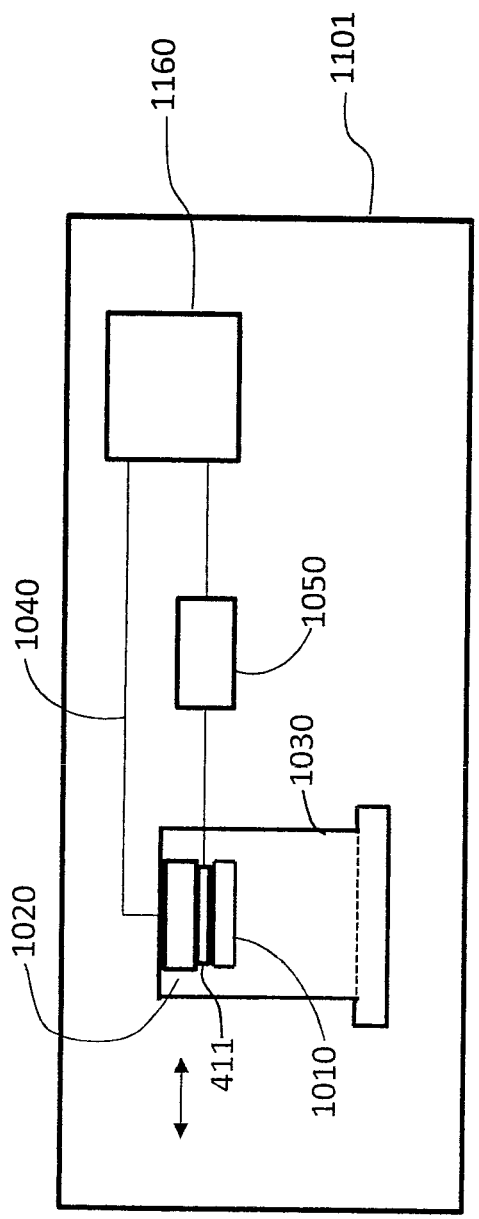
Fig. 11 Digital Scanning Field-of-view Camera

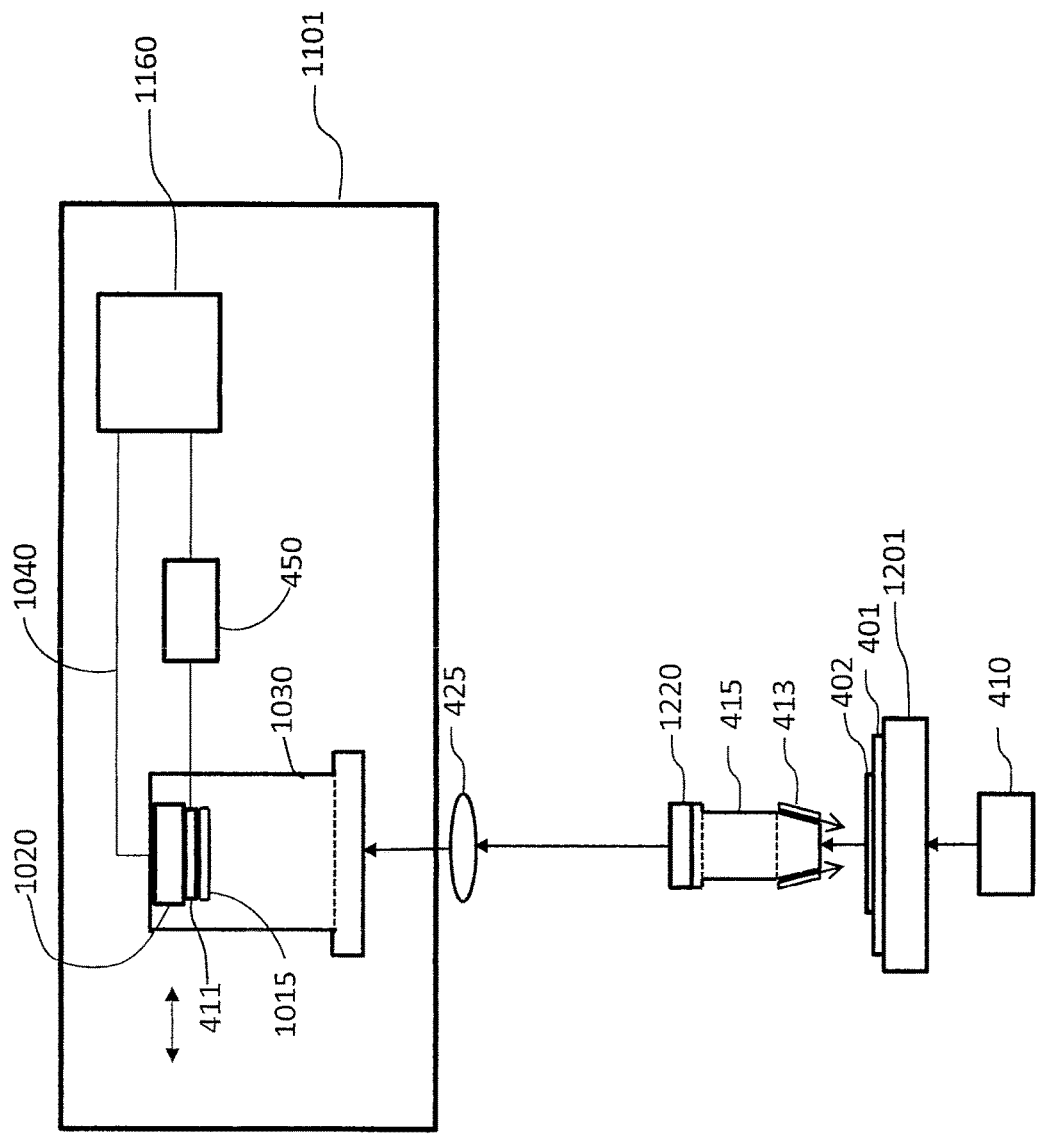
Fig.12 Manual Microscope with Scanning Field-of-View Camera

SCANNING MICROSCOPE USING A MOSAIC SCAN FILTER

FIELD OF THE INVENTION

This invention relates to the fields of scanning microscope imaging of large specimens with particular emphasis on RGB brightfield imaging, as well as fluorescence and spectrally-resolved imaging. Applications include imaging tissue specimens, genetic microarrays, protein arrays, tissue arrays, cells and cell populations, biochips, arrays of biomolecules, fluorescent nanoparticles, semiconductor materials and devices, and many others.

SUMMARY OF THE INVENTION

A mosaic scan filter array for use with a detector array comprises a plurality of identical tiles, each tile having N rows and M columns, where N is equal to or greater than 1 and M is equal to or greater than 2. One row of tiles extending across a width of the detector array constitutes a base pattern covering N rows of pixels of the detector array in a direction perpendicular to a scan direction. The base pattern is repeated M times and laterally offset in one direction by one pixel width for each repetition of the base pattern. The base pattern and the laterally offset repetitions constitute a repeat pattern, which covers at least an active area of the detector array. The active area of the detector array contains at least one repeat pattern of the mosaic scan filter array. Each identical tile of the mosaic scan filter array has MxN filters selected from the group of one or more of the following: red filters, green filters, blue filters, white filters, any white filters being clear filters, fluorescence emission filters and a series of narrow spectral band filters covering a continuous spectral range.

A scanning microscope for obtaining an image of at least a portion of a large microscope specimen, the microscope comprising:
a) an illumination system to illuminate a part of the specimen being scanned;
b) at least one lens that focuses light from the specimen onto a two dimensional detector array, the specimen being mounted on a support that is movable relative to a two dimensional detector array;
c) a motion of the support relative to the detector array being controlled by a computer, the motion of the support relative to the detector array being in a direction perpendicular to rows of the two dimensional detector array;
d) the two dimensional detector array having a mosaic scan filter array with a plurality of identical tiles, each tile comprised of N rows and M columns, where N is equal to or greater than 1 and M is equal to or greater than 2. One row of tiles across a width of a detector array constitutes a base pattern covering N rows of pixels of the detector array in a direction perpendicular to a scan direction. The base pattern is repeated M times and laterally offset in one direction by one pixel width for each repetition of the base pattern. The base pattern and the laterally offset repetitions constitute a repeat pattern which covers at least an active area of the detector array. The active area of the detector array contains at least the repeat pattern of the mosaic scan filter array;
e) a computer to control the detector array to capture sequential substantially overlapping frame images of the specimen each time that an optical image of the specimen is moved a distance relative to the detector array that is equal to the distance between adjacent rows of the detector array. Image data from each frame image is translated into computer memory to match a motion of an optical image across the detector array and added to or averaged with any data previously stored in that pixel position to generate an image of a strip across the specimen. The computer capturing of frame images continues until the specimen is moved a relative distance where all object points in that strip have been exposed a number of times equal to a chosen number of active rows in the detector array. There is one strip generated for each distinctive colour of the mosaic scan filter array; and
f) one or more final images of the specimen resulting from the portion of the specimen scanned, each pixel of the one or more final images containing information from each of the distinctive pixels of all of the distinctive pixels of the mosaic scan filter array.

A scanning microscope for obtaining an image of a single-field-of-view of microscope optics comprising:
a) an illumination system to illuminate a part of the specimen being scanned;
b) at least one lens that focuses light from the specimen onto a two dimensional detector array, the specimen being mounted on a support that is movable relative to a two dimensional detector array;
c) a motion of the support relative to the detector array being controlled by a computer, the motion of the support relative to the detector array being in a direction perpendicular to rows of the two dimensional detector array;
d) The two dimensional detector array having a mosaic scan filter array with a plurality of identical tiles, each tile comprised of N rows and M columns, where N is equal to or greater than 1 and M is equal to or greater than 2. One row of tiles extends across a width of a detector array and constitutes a base pattern covering N rows of pixels of the detector array in a direction perpendicular to a scan direction. The base pattern is repeated M times and laterally offset in one direction by one pixel width for each repetition of the pattern. The base pattern laterally offset repetitions constituting a repeat pattern which is repeated over an active area of the detector array, where the active area of the detector array is substantially the whole area of the detector array;
e) A computer controls the detector array to capture sequential substantially overlapping frame images of the specimen each time that an optical image of the specimen is moved a distance relative to the detector array that is equal to the distance between adjacent rows of the detector array. The computer captures n frame images in sequence where n equals MxN. Image data from each frame image is translated into computer memory to match a motion of the optical image across the detector array and added to any data previously stored to generate a single-frame image of the specimen. Each pixel of the single-frame image contains information from each distinctive colour of the mosaic scan filter array such that the final single-field-of-view image has full colour information in each pixel.

A scanning camera for obtaining an image of a single-field-of-view of an optical system comprising:
a) an illumination system to illuminate a part of the specimen being scanned;

b) at least one lens that focuses light from the specimen onto a two dimensional detector array, the two dimensional detector array being mounted on a support that is movable relative to a specimen being imaged;

c) a motion of the support of the detector array being controlled by a computer, the motion of the support relative to the specimen being in a direction perpendicular to rows of the two dimensional detector array;

d) The two dimensional detector array having a mosaic scan filter array with a plurality of identical tiles, each tile comprised of N rows and M columns, where N is equal to or greater than 1 and M is equal to or greater than 2. One row of tiles across a width of the detector array constitutes a base pattern covering N rows of pixels of the detector array in a direction perpendicular to a scan direction. The base pattern is repeated M times and laterally offset in one direction by one pixel width for each repetition of the base pattern. The base pattern and the laterally offset repetitions constituting a repeat pattern which is repeated over the active area of the detector array. The active area of the detector array is substantially the whole area of the detector array.

e) A computer controls the detector array to capture sequential substantially overlapping frame images of the specimen each time that the detector array is moved a distance that is equal to the distance between adjacent rows of the detector array. The computer captures n frame images in sequence where n equals MxN. Image data from each frame image is translated in computer memory to match a motion of the optical image across the detector array and added to any data previously stored to generate a single-frame image of the specimen. Each pixel of the final single-frame image contains information from each distinctive colour of the mosaic scan filter array such that the final single-field-of-view image has full colour information in each pixel.

A method of using a mosaic scan filter array comprises a plurality of identical tiles, each tile having N rows and M columns where N is equal to or greater than 1 and M is equal to or greater than 2. One row of tiles extends across a width of a detector array constituting a base pattern covering N rows of pixels of the detector array in a direction perpendicular to a scan direction. The base pattern repeated M times and laterally offset in one direction by one pixel width for each repetition of the base pattern, the base pattern and the laterally offset repetitions of the base pattern constitutes a repeat pattern which covers at least an active area of the detector array. The active area of the detector contains at least one repeat pattern of the mosaic scan filter array. Each identical tile of the mosaic scan filter array has MxN filters selected from the group of one or more of the following: red filters, green filters, blue filters, white filters, any white filters being clear filters, fluorescence emission filters and a series of narrow spectral band filters covering a continuous spectral range. The method comprises using the mosaic scan filter with the detector array to image at least part of a specimen and producing one or more final images of the specimen where each pixel of the one or more final images has full colour information for each distinctive colour of the mosaic scan filter array.

A method of using a mosaic scan filter array with one or more of a scanning microscope and a scanning camera, the scanning microscope or scanning camera having:

a) an illumination system to illuminate a part of the specimen being scanned;

b) at least one lens that focuses light from the specimen onto a two dimensional detector array, the specimen being mounted on a support that is movable relative to a two dimensional detector array;

c) a motion of the support relative to the detector array being controlled by a computer, the motion of the support relative to the detector array being in a direction perpendicular to rows of the two dimensional detector array;

d) the two dimensional detector array having a mosaic scan filter array with a plurality of identical tiles, each tile comprised of N rows and M columns, where N is equal to or greater than 1 and M is equal to or greater than 2, one row of tiles across a width of a detector array constituting a base pattern covering N rows of pixels of the detector array in a direction perpendicular to a scan direction, the base pattern repeated M times and laterally offset in one direction by one pixel width for each repetition of the base pattern, the base pattern and the laterally offset repetitions constituting a repeat pattern which covers at least an active area of the detector array, and where the active area of the detector contains at least one repeat pattern of the mosaic scan filter array;

e) a computer to control the detector array to capture sequential substantially overlapping frame images of the specimen each time that an optical image of the specimen is moved a distance relative to the detector array that is equal to the distance between adjacent rows of the detector array, image data from each frame image translated into computer memory to match a motion of an optical image across the detector array and added to or averaged with any data previously stored to generate an image of a strip across the specimen, the computer capturing of frame images continuing until the specimen is moved a relative distance where all object points in that strip have been exposed a number of times equal to a chosen number of active rows in the detector array, there being one strip generated from each distinctive colour of the mosaic scan filter array;

the method comprising activating the scanning microscope or scanning camera to obtain one or more final images of the specimen resulting from the portion of the specimen being scanned, each pixel of the one or more final images containing information from each of the distinctive colours of the mosaic scan filter array.

Definitions

For the purposes of this patent document, a "macroscopic specimen" (or "large microscope specimen") is defined as one that is larger than the field of view of a compound optical microscope containing a microscope objective that has the same Numerical Aperture (NA) as that of the scanner described in this document.

For the purposes of this patent document, TDI or Time Delay and Integration is defined as a method and detectors used for scanning moving objects, usually consisting of a CCD-based detector array in which charge is transferred from one row of pixels in the detector array to the next in synchronism with the motion of the real image of the moving object. As the object (and its image) moves, charge builds up and the result is charge integration just as if a longer exposure were used in a stationary imaging situation. When the image (and integrated charge) reaches the last row of the array, that line of pixels is read out. One example of such a camera is the DALSA Piranha TDI camera. CMOS TDI imagers have also been developed. CCD TDI imagers combine signal charges, while CMOS TDI imagers combine voltage signals.

For the purposes of this patent document the term "image acquisition" includes all of the steps necessary to acquire and produce the final image of the specimen, including some of but not limited to the following: the steps of preview scanning, instrument focus, predicting and setting gain for imaging each fluorophore, image adjustments including demosaicing (where required), scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting, assembling and viewing the final image.

For the purposes of this patent document, a "frame grabber" is any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition includes direct camera connections via USB, Ethernet, IEEE 1394 ("FireWire") and other interfaces that are now practical.

Moving Specimen Image Averaging ("MSIA") is defined as the method and technology for acquiring digital strip images (image strips) across a large microscope specimen by capturing sequential overlapping frame images of a moving specimen where a new image frame is captured each time the specimen has moved a distance that causes the image of that specimen formed on a two-dimensional detector array to move a distance equal to the distance between rows of detectors in the detector array, image data from the new frame is translated (moved) in computer memory to match the motion of the optical image across the detector array, and is added to (or averaged with) the data previously stored to generate an image of a strip across the specimen, such procedure being continued until the specimen has moved a distance such that all object points in that strip have been exposed a number of times equal to the number of active rows in the detector array (usually chosen by defining a "detector area of interest" that has the width of the detector but a smaller number of rows than the detector array contains), or the number of rows of data chosen for processing from each frame image. The image strip that results has increased signal-to-noise ratio because of pixel averaging, where the increased signal-to-noise ratio is equal to the square root of the number of times each pixel has been averaged to produce the final MSIA strip image, and increased dynamic range.

A frame image and image frame are identical to one another and are used interchangeably throughout this patent document.

Fluorescence includes fluorescence from naturally-occurring sources inside the specimen and fluorescent dyes and markers (including quantum dots) that may be added to the specimen, as well as fluorescence from the substrate or a layer above the specimen.

Spectral imaging is the method and technology for acquiring images in which each pixel is represented by its spectrum.

Hyperspectral imaging is the method and technology for acquiring images in which each pixel is represented by a spectrum composed of narrow spectral bands over a continuous spectral range.

Imaging spectroscopy is the acquisition and processing of hyperspectral images.

Multispectral imaging is the method and technology for acquiring multiple images of an object, each image representing a range of wavelengths. For example, each image could represent the emission range (or part of the emission range) of a particular fluorophore. In this case each pixel in the final multispectral image does not contain a spectrum of the fluorescence emitted by the specimen at that position, but contains information about the signal detected from each fluorophore at that pixel position.

For the purposes of this patent document, a "mosaic scan filter array" is defined as a mosaic filter array that is designed for high resolution imaging using MSIA and Single-Field-of-View scanning where the resulting image has full colour information at each pixel position without demosaicing or interpolation.

OBJECTS OF THE INVENTION

It is an object of this invention to provide an instrument and method of imaging whereby MSIA scanning is used to produce an RGB brightfield image of a large microscope specimen using a mosaic filter array where no interpolation is required to produce the final RGB image which contains full colour information (R,G, and B values) at each pixel position.

It is an object of this invention to provide an instrument and method of imaging whereby MSIA scanning is used to produce an image of a large microscope specimen which is comprised of an RGB colour image and/or a greyscale (panchromatic) image using a mosaic scan filter array where no interpolation is required to produce the final RGBW image which contains full colour information (RGBW values) at each pixel position.

It is an object of this invention to provide designs for scan filters that can be used for RGB or RGBW MSIA imaging as well as for single-field-of-view scan imaging where the filter array is a mosaic scan filter array and no interpolation is required to produce the final image which contains full colour information at each pixel position.

It is an object of this invention to provide an instrument and method of imaging whereby MSIA scanning is used to produce an image of a large microscope specimen which is comprised of an RGB colour image and/or a greyscale (panchromatic) image using a mosaic scan filter array where no interpolation is required to produce the final RGBW image which contains full colour information (RGBW) at each pixel, and using single-field-of-view scan imaging to provide a single field-of-view image of the specimen where no interpolation or demosaicing is required to produce the final RGB or RGBW image which contains full colour information at each pixel position.

It is an object of this invention to provide a camera and method of RGB or RGBW imaging for use with a standard optical microscope (single-field-of-view scan imaging) using a mosaic scan colour filter array where no demosaicing is required to produce the final image which contains full colour information at each pixel position.

It is an object of this invention to provide an instrument and method of imaging whereby MSIA scanning is used to produce an image of a large microscope specimen which is comprised of an RGB colour image and/or a greyscale (panchromatic) image and/or a multi-spectral fluorescence image using a mosaic scan filter array where no interpolation is required to produce the final RGBW image which contains full colour information (RGBW) at each pixel position, and using single-field-of-view scan imaging to provide a single field-of-view image of the specimen where no interpolation or demosaicing is required to produce the final RGB or RGBW and/or multispectral fluorescence image which contains full colour information at each pixel position.

It is an object of this invention to provide an instrument and method of imaging whereby MSIA scanning is used to produce an image of a large microscope specimen which is comprised of an RGB colour image and/or a greyscale (panchromatic) image and/or a hyperspectral image using a mosaic scan filter array where no interpolation is required to produce the final RGBW image which contains full colour information (RGBW) at each pixel, and using single-field-of-view scan imaging to provide a single field-of-view image of the specimen where no interpolation or demosaicing is required to produce the final RGB or RGBW image and hyperspectral image which contains full colour information at each pixel position.

It is an object of this invention to provide an instrument and method of imaging that uses a mosaic scan colour filter array for MSIA scanning for hyperspectral and/or multispectral imaging and also acquires single-field-of-view multispectral and/or hyperspectral images.

It is an object of this invention to provide a camera and method of multispectral or hyperspectral imaging using a mosaic scan colour filter array for use with a standard optical microscope (single-field-of-view imaging).

It is an object of this invention to provide designs for mosaic scan colour filter arrays that can be used for multispectral or hyperspectral imaging using MSIA technology and methods.

It is an object of this invention to provide designs for mosaic scan filter arrays that can be used for multispectral or hyperspectral imaging and/or simultaneous RGB or RBGW imaging using MSIA technology and methods.

It is an object of this invention to provide designs for mosaic scan filter arrays that can be used for MSIA imaging as well as for single-field-of-view multispectral or hyperspectral imaging and/or RGB or RGBW imaging.

BRIEF DESCRIPTION OF THE DIAGRAMS

FIG. 1A shows a schematic view of a mosaic scan filter for RGB imaging;

FIG. 1B shows a schematic view of a mosaic scan filter for RGBW imaging;

FIG. 3A is a schematic view of data collection during MSIA scanning using a mosaic scan colour filter array for brightfield RGB imaging after a first exposure at the top and after a second exposure at the bottom;

FIG. 3B is a schematic view of data collection during MSIA scanning using a mosaic scan colour filter array for brightfield RGB imaging after a third exposure at the top and a second exposure at the bottom;

FIG. 3C is a schematic view of data collection during MSIA scanning using a mosaic scan colour filter array for brightfield RGB imaging after a fifth exposure at the top and after a second exposure at the bottom;

FIG. 4 shows a schematic view of an MSIA scanner using a mosaic scan filter array;

FIG. 5 shows a schematic view of a scanner for MSIA and single-Field-of-View scanning;

FIG. 6A is a schematic view of data collection during single-Field-of-View scanning using a mosaic scan colour filter array for brightfield RGB imaging after a first exposure;

FIG. 6B is a schematic view of data collection during single-Field-of-View scanning using a mosaic scan colour filter array for brightfield RGB imaging after a second exposure;

FIG. 6C is a schematic view of data collection during single-Field-of-View scanning using a mosaic scan colour filter array for brightfield RGB imaging after a third exposure;

FIG. 6D is a schematic view of data collection during single-Field-of-View scanning using a mosaic scan colour filter array for brightfield RGB imaging after a fourth exposure;

FIG. 7 is a schematic view of a mosaic scan filter array comprised of 4×4 pixel tiles where each tile is comprised of 2×2 pixel sub-tiles;

FIG. 8A is a schematic representation of a Mosaic Scan Filter array for fluorescence (multispectral) and brightfield imaging comprised of three-row by three-column tiles;

FIG. 8B is a schematic representation of a Mosaic Scan Filter Array for fluorescence imaging of six fluorophores comprised of two-row by three-column tiles;

FIG. 8C is a schematic representation of a Mosaic Scan Filter Array for fluorescence imaging of six fluorophores comprised of one-row by six-column tiles;

FIG. 9A is a schematic representation of a mosaic scan filter array comprised of three-row by three-column tiles for hyperspectral and brightfield imaging.

FIG. 9B is a schematic representation of a mosaic scan filter array for hyperspectral imaging comprised of three-row by three-column tiles;

FIG. 9C is a schematic representation of a Mosaic Scan Filter Array for hyperspectral imaging comprised of one-row by six-column tiles;

FIG. 10 is a schematic view of a combination MSIA and FOV scanner, where the FOV scanner uses a moving detector array that includes a mosaic scan colour filter array;

FIG. 11 shows a schematic view of a digital scanning FOV camera using a mosaic scan colour filter array; and FIG. 12 shows a schematic view of a digital scanning FOV camera mounted on a microscope with a manual stage.

DESCRIPTION OF THE INVENTION

Figure 2:
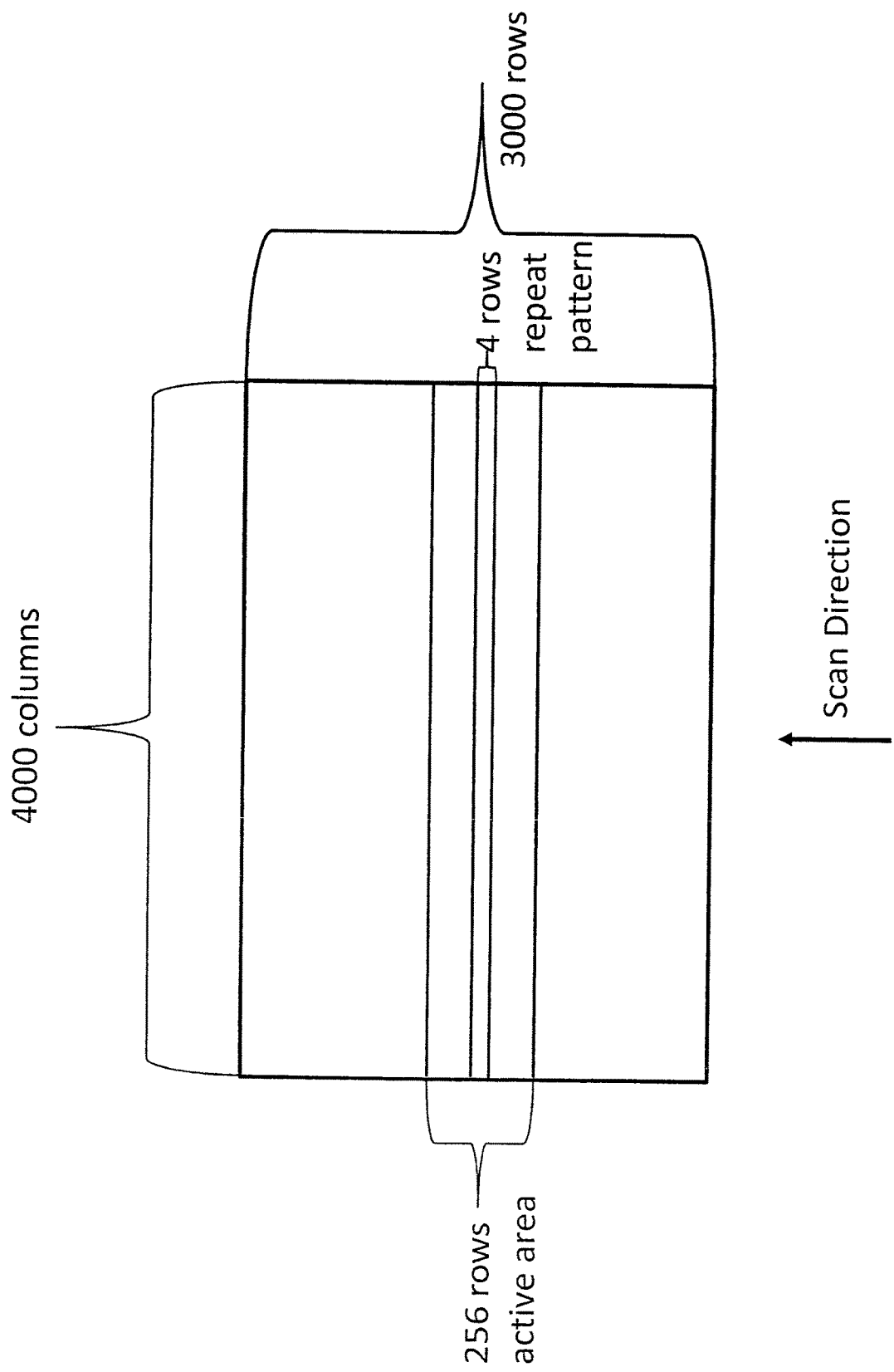
FIG. 2 is a schematic view of a 4000 column by 3000 row detector array covered by a mosaic scan colour filter array.

FIG. 1A shows a schematic representation of a mosaic scan filter for brightfield imaging that is a first embodiment of this invention. This example is a scan filter for MSIA imaging with a base pattern comprised of two row by two column tiles extend across the entire mosaic scan filter. The tiles in each repetition of the base pattern required to form a Repeat pattern must be displaced laterally a distance equal to the distance between pixels in one direction so that each column of pixels detected during MSIA scanning contains all three colours (R,G ad B). The R, G and B first repetition of the base pattern is identical to the base pattern except for the one pixel with displacement relative to the base pattern. The Repeat Pattern has 10 columns and 4 rows in a direction perpendicular to a scan direction when covering an area detector array (not shown in FIG. 1A). The Repeat Pattern can be repeated any number of times depending on the size of the area detector, there being at least one repeat pattern in the mosaic scan filter. Repetitions of the base pattern can be displaced by one pixel width either to the right or to the left relative to the base pattern and will result in the identical Repeat Pattern. However, if the first repetition of the base pattern is displaced to the right and any additional repetitions of the base pattern must also be displaced to the right. The displacement relative to the base pattern must always be in the same direction (ie. one direction) for each repetition. Each column contains equal numbers of R and B filter components, and there are twice as many G filter components as there are R and B in each column. Also note that the R, G and B filters in each tile can be in any position, as long as all tiles in the mosaic scan filter are identical and the tiles are arranged with a one-pixel-width displacement from one row of tiles to the next.

An RGBW mosaic scan filter is shown in FIG. 1B, which is the second embodiment of this invention, where again the position of R, G, B and W elements in each tile is not important, as long as all tiles are identical and are arranged in a base pattern across the mosaic scan filter which has 10 columns and 4 rows. There is one repetition of the base pattern to form a repeat pattern with the one repetition being displaced laterally from the base pattern by one pixel width in one direction. With the second row of tiles displaced one pixel width to the right when compared to the first row of tiles and that pattern is repeated across the entire area of the detector array. When used with a detector array or area detector, the base pattern and the Repeat Pattern extends across the entire area of the detector array. This arrangement of tiles ensures that all colours in the mosaic scan filter array are present in each and every column of the filter array, which means that no interpolation of data between columns is required to produce a final scanned image containing full colour information at each pixel, which results in higher resolution than would be present in the final image if interpolation were required. Mosaic scan filter arrays comprising tiles larger than 2×2 (3×3 or 4×4 for example) also work well as long as each subsequent row of tiles is displaced one pixel width to the right of the previous row, such that all colours are present in each and every column in the active area of the detector array. A single row of tiles is called a "base pattern", where in this example the base pattern covers two rows of pixels in the detector array. A "repeat pattern" is the pattern of rows of tiles that is repeated across the active area of the detector array (usually across the entire area of the detector array).

FIG. 2 shows a schematic view of a detector array that is (in this example) 4000 pixels wide and 3000 rows long, where the entire area of the detector array is covered with a mosaic scan filter array with a pattern of rows that is repeated many times, and where the repeat pattern is small compared to the number of rows in the array. When used for MSIA scanning, it is common to choose an active area of the detector array that includes the entire width of the array, and a smaller number of active rows near the center of the array. This has the advantage of increasing the scan speed since each frame image acquired during the MSIA scan is only 256×4000 pixels in size (in this example), and many cameras have a much increased frame rate when using a small active area like this one. For this example, assume that the pattern of the mosaic scan filter array that has been fabricated on top of the pixels in the detector array is repeated every 4 rows of pixels. In this particular example, when used for MSIA scanning using a mosaic scan filter array, and with the active area just described, and four different colours (RBGW, for example), every pixel position in the repeat pattern will be exposed 64 times during the scan, so the Signal/Noise ratio in the final MSIA image strip is increased by MSIA averaging by a factor of the square root of 64 (a factor of 8).

Figure 3B:
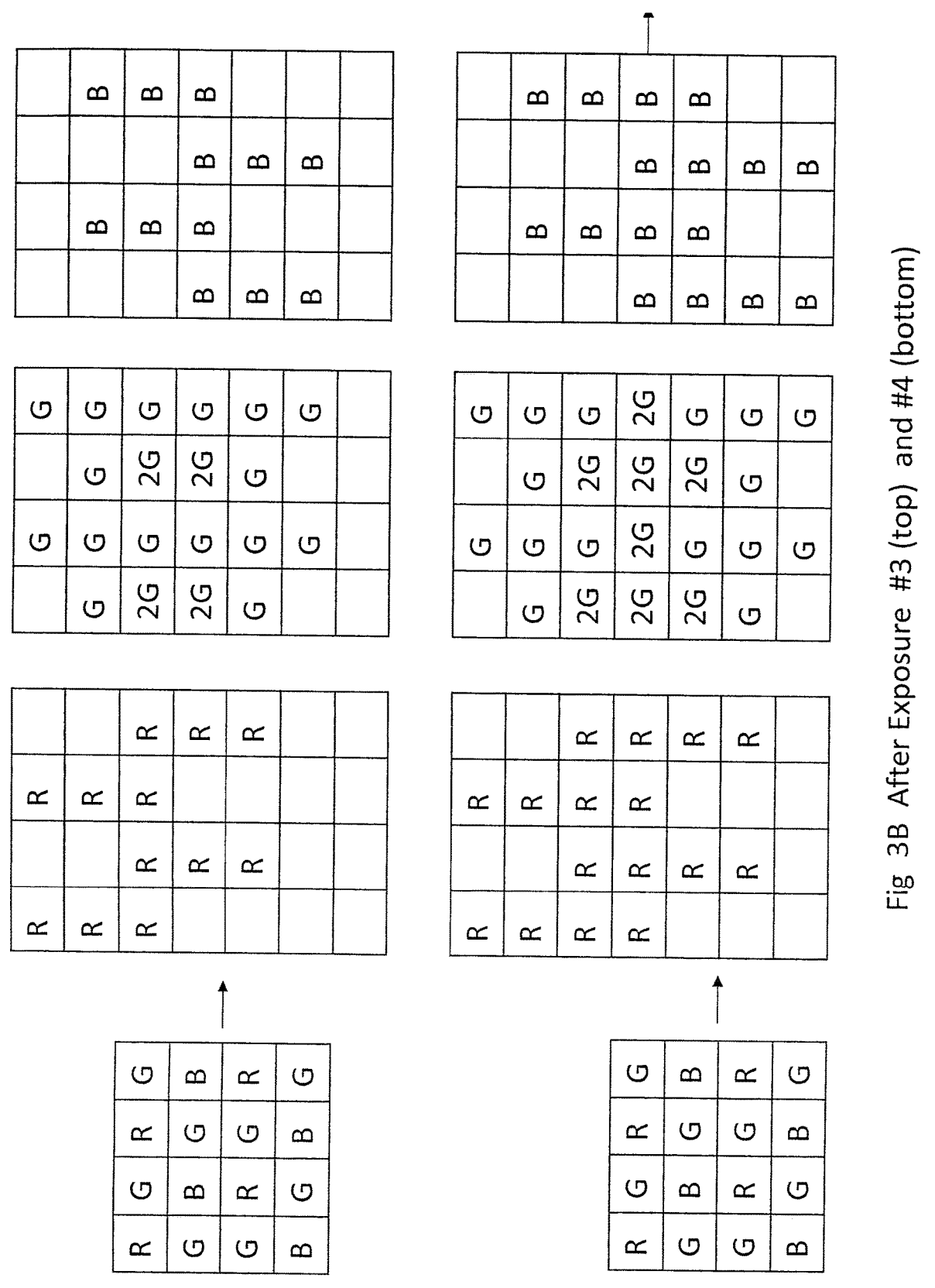
Figure 3C:
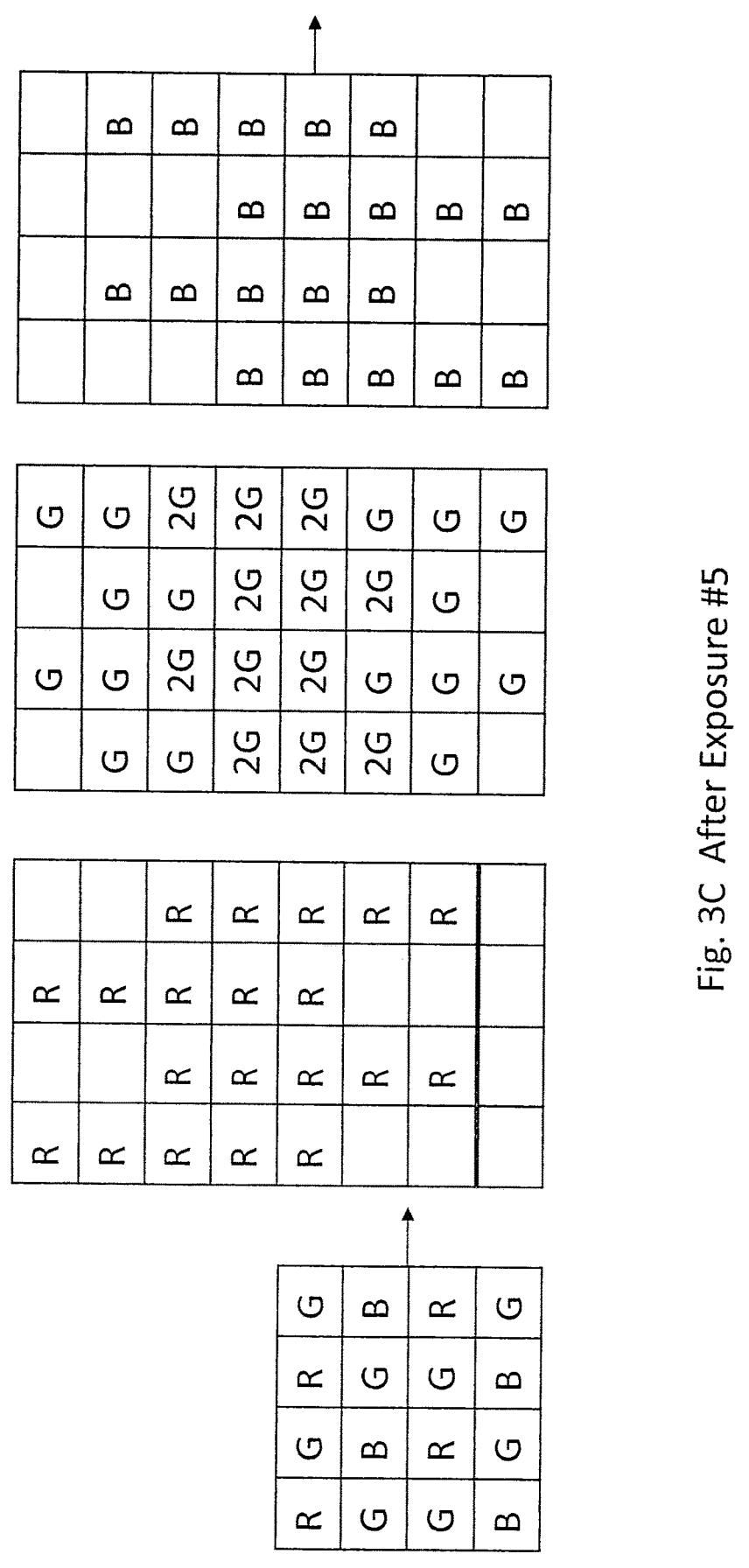

FIG. 3 shows how data is collected and strip images are assembled during an MSIA scan using a mosaic scan colour filter example in which the repeat pattern is 4 rows, and the active area of the detector has been selected to be 4 rows by 4000 columns. FIG. 3A shows a schematic view of the filter on the left (although shown as only 4 columns wide in this diagram, this is meant to represent a filter and detector array that is 4000 columns wide (in this example). On the right side of the diagram, three image strips, one for each colour in the filter array, also represent image strips that are 4000 pixels wide. After the first exposure, frame grabber 450 (see FIG. 4) transfers image data from all 4 rows of the detector array (this is the first frame image) to computer 406 which stores data in three image strips, one for each colour in the mosaic scan filter array, as shown on the right side of FIG. 3A. As the scanning stage moves a distance that moves the image of the specimen (projected by the microscope optics onto the detector array) a distance equal to the distance between rows of pixels in the detector array, a second exposure is made and this image data is passed to computer 406 by frame grabber 450, and is added to the data already stored in the image strips, as shown in FIG. 3A (bottom). FIG. 3B shows the result after the third exposure (top) and fourth exposure (bottom). FIG. 3C shows the result after the fifth exposure-note that the data in Image Strips Row 4 has not changed since that shown after the fourth exposure (FIG. 3B (bottom) and Row 5 is also now completely exposed. In this simple case (a filter with a repeat pattern of 4 and using an active area of 4), Row 4 in the strip image has been completed after 4 exposures, and a new row in the image strips has been completed after the fifth exposure. After 4 exposures, a new row will be completed in the strip images after each subsequent exposure.

A more complicated example (repeat pattern 4 rows and active detector area 64 rows) is more useful for MSIA. In this case, the first row in the strip images that has been completely exposed is row number 64 (after exposure number 64), and it contains data resulting from measuring each R and B pixel 16 times, and each G pixel in that strip image row 32 times. When these measurements are averaged, the signal/noise ratio of the R and B pixels is increased by the square root of 16 (a factor of 4) and of the G pixels by the square root of 32 (a factor of 5.6). As before, a new row is completed in the strip images when each exposure is made after exposure number 64. The general rule is that the repeat pattern covers n=N×M rows (where in each tile N=number of rows and M=number of columns), and when the active detector area is P rows, the first row in the strip images that will be completely exposed is row P, and (when all colours in a tile are different—e.g. RGBW) the increase in signal/noise of each pixel is equal to the square root of (P/n).

FIG. 4 is a schematic representation of an MSIA scanner using a mosaic scan filter array that is a third embodiment of this invention. Light from light source 410 illuminates from below an area of the surface of specimen 402, which is mounted on specimen holder 401 on moving microscope stage 405. This kind of illumination, where the light illuminating the specimen comes from below and is transmitted through the specimen, is commonly used for brightfield imaging. The motion of Microscope stage 405 is controlled by computer 406 through wired or wireless connection 407. Motion of the microscope stage is in a direction perpendicular to rows in the detector array {data is read out from rows in the detector array, usually the long dimension of the array (for example see Hamamatsu's ORCA-flash 4.0 camera, or PCO's pco.edge camera, both of which use Scientific CMOS (sCMOS) detector arrays)}. Light from the specimen is collected by microscope objective 415 which is focused on the specimen by piezo positioner 420 (or other focusing mechanism) and is focused by tube lens 425 onto detector array 411, which is covered by a mosaic scan colour filter array 412 like that shown in FIG. 1. Detector array 411 and colour filter array 412 are enclosed in camera 430. Data from the detector array 411 is read out by frame grabber 450 and passed to computer 406 where an image strip is assembled for each colour in the mosaic scan imaging filter. Image data for each exposure is passed by the frame grabber to the computer where it is added to or averaged with data already present in the lengthening image strips in the Moving Specimen Image Averaging (MSIA) process.

Note that when storing data in the MSIA strip images, a different averaging calculation can be used for each colour in the mosaic scan filter array, which allows the gain for each colour to be adjusted to calibrate the white balance of this scanning microscope.

Note that the W (clear) filter allows all of the incident light through to the detector pixel underneath. If this causes blooming when doing RGB imaging, a neutral density filter can be used instead of the W (clear) filter in the mosaic scan filter array to match the intensity of signal from the W pixels to that from the R, G and B pixels.

FIG. 5 shows a schematic representation of an MSIA scanner that can also acquire Single-Field-of-View images (an SFOV scanner) using a mosaic scan filter like those described in this document (designed for RBG or RBGW imaging, and sometimes for multi-spectral or hyperspectral imaging as well) which is a fourth embodiment of this invention. When used for brightfield imaging, light from light source 410 illuminates specimen 402 mounted on microscope slide or specimen holder 401, which is mounted on computer-controlled single-axis scanning stage 510, which is mounted on computer-controlled dual-axis scanning stage 405. Computer 560 controls scanning stage 405 through wired or wireless connection 407, and controls scanning stage 510 through wired or wireless connection 502. Scanning stage 510 moves in a direction perpendicular to rows in the detector array, the same direction that scanning stage 405 moves in when it is scanning a strip across the specimen (as shown by the horizontal (left-right) arrows to the left of each scanning stage in the diagram). When used for fluorescence imaging, light from light source 413 illuminates an area of the surface of microscope specimen 402, which is mounted on microscope slide or specimen holder 401 on scanning microscope stage 510. This kind of illumination, where the light illuminating the specimen comes from above the specimen, is called epi-illumination (epi-illumination can also be provided using other arrangements that are well known in microscopy). Light emitted by or reflected from the specimen is collected by microscope objective 415, and is focused by tube lens 425 onto detector array 411 which is covered by mosaic scan colour filter array 520 (inside digital camera 530), where the mosaic scan colour filter array covers the entire surface of the detector array. When used for MSIA scanning of strips across the specimen, scanning stage 510 remains stationary in a single position, and strip scanning is accomplished using scanning stage 405. MSIA scanning is accomplished using the repeat pattern of the filter array and an active region of interest in the detector array as described earlier in this document. Data from the active region of interest in detector array 411 is read out by frame grabber 450 and passed to computer 560 where an image strip is assembled for each colour represented by the filters in the Repeat Pattern of the spectral imaging mosaic scan filter. Image data for each exposure is passed by the frame grabber to the computer where it is added to or averaged with data already present in the lengthening image strips in the Moving Specimen Image Averaging (MSIA) process, as described earlier in this document. When scanning of a strip is completed and the strip image has been calculated and assembled, scanning stage 405 moves in a direction perpendicular to the scan direction (shown by the arrow pointing into and out of the diagram to the left of scanning stage 405) to a position centered on an adjacent strip to be imaged on the specimen, and a second strip is scanned. This procedure is continued until the entire specimen has been scanned (or the area of a region of interest on the specimen has been scanned).

When a feature of interest has been identified in the scanned MSIA image, scanning stage 405 is controlled by computer 560 to move the feature of interest to the centre of the field of view of microscope objective 415, and scanning stage 405 is held stationary at this position. At this position, an image of the portion of the specimen inside the field of view of the microscope optics is projected onto detector array 411 that is covered by scanning mosaic colour filter array 520. A spectrally-resolved single-frame image of that portion of the specimen can be acquired as follows: With scanning stage 405 held in a stationary position, and using the entire area of the detector array as an active area, a first image of the specimen is acquired by opening and closing the shutter. This image contains rows of data that match the rows of the mosaic scan filter array, repeated across the whole field of view of the microscope. As an example, see FIG. 6A. The left side of FIG. 6A shows the repeat pattern of a scanning mosaic array detector which is covered by R, G and B transmission filters. In this example (which describes RGB imaging), rows of 2×2 pixel tiles (covering two rows of pixels in the array) cover the entire width of the detector array, with each row of tiles followed by a subsequent row of tiles that is displaced a distance equal to the distance between pixels in the direction along the row. This repeat pattern of 2 rows of tiles (4 rows of pixels) is repeated to cover the entire surface of the detector array. In order to use less space in the diagram, the left strip shows only two pixels in each row, however this represents rows that are the entire width of the detector. As an example, consider a detector array that is 4000 pixels wide (rows are 4000 pixels long) and 3000 pixels high (there are 3000 rows), and the entire detector array is covered with a scan filter array that has 3000 rows that are 4000 pixels long. When performing single field-of-view scanning, data is read from the entire detector array—a smaller active area is not used. Each frame image is represented by a strip that is shown in FIG. 6 as two pixels wide, however each of the image frames is 4000 pixels wide, and 3000 pixels long, and there are three image frames (one for each colour in the mosaic scan colour filter array). The first exposure is made of the specimen by opening and closing the shutter without moving stage 510. After the first exposure, the frame grabber transfers data from the entire image to computer 560 and data from each pixel in the detector is stored in the image frame row and column that corresponds with that pixel's colour filter. The Scan Direction arrow (top left) shows the relative motion of the projected image across the detector array. This diagram shows the detector array moving downward while the frame images are stationary, however it is also possible to represent the process by showing a stationary detector array with the six image frames moving upwards on the diagram. For this representation, consider the RG row at the top of the detector on the left side of the diagram to be the first row of pixels at the top of the detector, and the rows below it on the diagram are the first few rows of the 3000 rows on the detector. When the first exposure is made, the data from that exposure is stored in the three image frames as shown. Stage 510 moves specimen 402 a distance equal to the distance between pixel positions on the specimen (object pixel positions as opposed to image pixel positions) and stops, and a second exposure is made. Data acquired during the second exposure is passed by frame grabber 450 to computer 560 which then stores this data in the three image frames (see FIG. 6B). Stage 510 again moves specimen 402 a distance equal to the distance between pixel positions and stops. A third exposure is made and the data stored in the three image frames (see FIG. 6C). The specimen is moved a third time, a fourth exposure is made and the data is stored in the image frames, as shown in FIG. 6D. This is the last exposure that is necessary—the image frames starting at row 4 now each contain a complete image of the specimen filtered through their respective transmission filters. The first frame (the R frame in the diagram) contains a full field of view image of the specimen (minus 3 rows at the top and 3 rows on the bottom, or 2994 rows). Each of the other images is the same, and all three images are perfectly registered with one another after the top and bottom three rows are discarded. When the mosaic scanning colour filter array has a Repeat Pattern of N rows of pixels, each Single-Field-of-View scan will require N-1 steps, with N exposures, and there will be one frame image for each colour in the scanning colour filter array, each of which will result in a Single-Field-of-View image filtered through the transmission filter for each colour in the scan colour filter array.

Scanning microscopes are often designed to have a resolution such that the "actual pixel" resolution shown on the computer screen is 0.25 microns or better. For example, that resolution can be achieved in a scanner using a 20× microscope objective with a numerical aperture of 0.75 or better (to achieve the 0.25 micron resolution on the specimen) and a working distance of 1 mm (so focus changes do not cause the objective to hit the specimen during scanning). With a 20× objective, this matches a detector array with 5 micron pixels, which are readily available. When performing Single-Field-of-View scanning using this combination of microscope objective and detector array, each step motion of stage 510 is 0.25 microns, and for very high resolution imaging the accuracy and repeatability of motion should be better than .025 microns, which is a stringent requirement. The range of motion can be quite small, because even for Repeat Patterns as large as 256 rows, the range of motion is only 64 microns, which is less than 0.1 mm. One type of stage that meets these requirements is the piezo stage, which has a very small range of motion, but both the range of motion and the accuracy and repeatability meet these requirements. Motor-driven stages generally have a much larger range of motion, but do not have the accuracy and repeatability necessary for this application. If a motor-driven stage is found that meets these requirements, or if the requirements are relaxed because of reduced resolution, then a separate stage will not be required for Single-Field-of-View scanning, and stage 405 can be used for both MSIA and Single-Field-of-View scanning.

Single-Field-of-View scanning has several interesting features:

First, the separate image types (in the example shown in FIG. 8A, for example) R,G,B,W and F1,F2,F3,F4,F5 (where F1,F2,F3,F4, and F5 represent emission filters for five fluorophores) can be acquired separately by making two scans from the same starting position of stage 510, one for R,G,B,W and one for F1,F2,F3,F4,F5 using white-light epi or transmission illumination for R,G,B imaging and a narrow band epi-illumination wavelength for fluorescence imaging (separate repeat scans can be made for each fluorophore using different excitation wavelengths if required). In this case, when the first scan is made to image R,G,B,W the data acquired by the detector for F1,F2,F3,F4,F5 (which are not illuminated correctly) are discarded, and then in a second scan where illumination is correct for fluorescence imaging but not for RGBW imaging, the data for RGBW are discarded and that for F1,F2,F3,F4,F5 are recorded in the appropriate image frames. This way two scans are used to record 9 perfectly registered images using two different illuminations.

Alternatively, instead of multiple scans, multiple exposures using different light sources matched with specific filters in the mosaic colour filter array or with external filters and a White row in the colour filter array can be made at each stage position when performing single-field-of-view scanning, so that all of the images at each stage position will be perfectly aligned and registered and only one scan is required.

Second, since only N-1 steps are required to acquire a complete image, and stage 510 stops at each position, exposure time can be increased when the signal strength is low (for example for fluorescence imaging when compared to brightfield RGB imaging).

Third, the same camera with an RGB and spectral imaging mosaic scan filter can be used to image RGB specimens in both MSIA scanning and Single-Field-of-View scanning (by discarding information from the detector pixels dedicated to spectral imaging) and can be used for imaging fluorescence or photoluminescence specimens in both MSIA scanning and Single-Field-of-View scanning by discarding information from RGB pixels in the detector.

Fourth, since more than one Single-Field-of-View image can be acquired from the same starting point for stage 510, a series of images can be acquired at different focus depths in the specimen, resulting in a 3 dimensional image stack.

Fifth, by moving stage 510 to a new position using stage 405, Single-Field-of-View images can be acquired of adjacent areas of the specimen that can be stitched together to provide an image of an area of the specimen that is larger than a single field of view. If Single-field-of-View images are acquired at different focus depths and then adjacent areas are imaged in the same way, since the focus stack images are registered with each other in each stack, it is easy to stitch together the images stack-by-stack to provide a three dimensional image of an area of the specimen that is larger than a single field of view.

Sixth, when using a combined mosaic RGB and spectral imaging scan filter, each of the stacked 3D images contains perfectly registered RGB and spectrally-resolved images in each image plane in the stack.

Seventh, High Dynamic Range SFOV images can be acquired by combining multiple SFOV images of the same field of view which have been acquired using different exposure times.

Several designs of mosaic scan filters are possible:

FIG. 7 shows a mosaic RGB Scan Filter Array that uses 4×4 pixel tiles (each comprised of four 2×2 pixel sub-tiles), instead of the 2×2 pixel tiles used in FIG. 1A, that is a fifth embodiment of this invention. The mosaic scan filter described in FIG. 7 has a base pattern of 4 rows and 10 columns and has a repeat pattern that is 8 rows of pixels long and 10 columns. The Repeat Pattern is comprised of tiles that are made by combining four small 2×2 pixel tiles into a single large 4×4 pixel tile. This pattern is repeated across the entire surface of the detector array. Like the mosaic scan filter described in FIG. 1A, the large tiles in each subsequent row of large tiles must be displaced laterally a distance equal to the distance between pixels in the direction of rows of pixels so that each column of pixels detected during MSIA scanning will contain all of the colours contained in the filter array, which allows the final MSIA strip images to contain data in every pixel position in the strip image columns each repetition of the base pattern must be displaced laterally by one pixel width relative to the immediately adjacent pattern. This means that no interpolation of data between columns is required to produce a final scanned image containing full colour information at each pixel position, which results in higher resolution than would be present in the final image if interpolation were required. When used for single field-of-view scanning, the mosaic array described in FIG. 7 requires eight exposures to acquire an entire RGB single field-of-view scanned image.

FIG. 8A shows a mosaic scan filter array for RGBW imaging that also includes transmission filters that act as emission filters for different fluorophores that is a sixth embodiment of this invention. This mosaic filter is comprised of 3×3 pixel tiles extending across the mosaic scan filter array to form a base pattern. The base pattern is highlighted at least once in a bold border in each of FIGS. 8A to 9C. There are two repetitions of the base pattern and each repetition is displaced laterally by one pixel width in one direction relative to the immediately preceding pattern. The first repetition following the base pattern is displaced laterally by one pixel width relative to the base pattern and the second repetition is displaced laterally by one pixel width relative to the first repetition. The base pattern and the three repetitions form a repeat pattern having 9 rows and 9 columns. Each column of pixels detected during MSIA scanning will contain all of the colours contained in the filter array. In this case, however, there are two repetitions of the base pattern that together with the base pattern form the repeat pattern, which must be 9 rows long to ensure that each column in the MSIA image strips will contain different colour information at every pixel position the mosaic scan filter array has RGBW pixels as well as 5 fluorophores. When used for both RGBW (W is a clear filter that results in a bright, panchromatic image) and fluorescence imaging using MSIA, several scans are usually necessary to collect all of the data. A first scan is often used to collect RGBW data, with transmission illumination provided by white light source 410. Data collected during this scan is stored in four strip images, one each for R, G, B and W. The computer has access to all of the image data in each frame image collected during the MSIA scan process, and can record data from the RGBW channels while not recording data from the fluorescence channels during the first scan. A second scan acquires data from fluorescence channels that are excited by the epi-illumination wavelengths chosen to illuminate the specimen for the second scan using epi-illumination light source 413 (or other epi-illumination arrangement (not shown)). See FIG. 4. As the second scan proceeds, the computer acquires data and sets up fluorescence strip images collected by detector pixels covered by transmission filters that match the emission wavelengths of one or more of the fluorophores excited by the chosen illumination wavelengths for this scan. The illumination wavelength of the epi light source 413 is then changed to match the excitation wavelength of one or more other fluorophores in the specimen, another scan is performed and data is acquired to be added to an additional fluorescence strip images containing data for those fluorophores. This is repeated until strip images for each of the fluorophores in the specimen have been acquired, and a final strip image of the specimen is assembled that contains R, G, B and W information and fluorescence intensity for each of several fluorophores for each pixel position in that strip across the specimen. Stage 405 is then moved to the start position to for a second strip across the specimen, and the sequence of scans is repeated to collect R, B, G and W information and fluorescence intensity for a second strip image. Finally, all of the combined brightfield and Fluorescence strip images are assembled to produce an area image of the specimen that contains R, B, G and W as well as Fluorescence intensity information for every pixel position in the scanned area of the specimen.

When used for single-field-of-view (SFOV) scanning, this mosaic scan filter array covers the entire area of the detector array and the entire array is active. Nine exposures are made to ensure that data will be acquired for each pixel position in the final FOV image, for each imaging modality (brightfield and fluorescence) and for each fluorophore. As shown in FIG. 5, after the first 9 exposures are completed using white light source 410 to acquire R, G, B and W data, the specimen is moved back to the start position and the stage is moved to acquire an additional 9 exposures using an excitation wavelength for one or more fluorophores using epi-illumination light source 413 (or other epi-illumination light source, not shown). Scans are repeated using different excitation wavelength and emission filter combinations until all of the fluorophores in the specimen have been imaged, and the data acquired in each scan is added to the single-field-of-view image. The final single-field-of-view image contains full colour information for each pixel (R, G, B, W plus information for each fluorophore in the specimen).

FIG. 8B shows a mosaic scan filter array for fluorescence imaging of six fluorophores having a base pattern comprised of two-row by three-column tiles extending across the mosaic scan filter array. As before, the tiles in each repetition of the base pattern required to form a repeat pattern must be displaced laterally a distance equal to the distance between pixels in one direction so that each column of pixels detected during MSIA scanning will contain all of the colours from all six fluorophores contained in the filter array. In this case, the repeat pattern must be 6 rows long to ensure that each column in the MSIA image strips will contain different colour information at every pixel position, and all colours will be included.

When used for single-field-of-view (SFOV) scanning, the mosaic scan filter array shown in FIG. 8B covers the entire area of the detector array and the entire array is active. For this mosaic scan filter array, six exposures are required in the SFOV scan to ensure that full colour data will be acquired for each pixel position in the final SFOV image, for each fluorophore. Up to 6 scans (of 6 exposures each) using excitation wavelengths for one or more fluorophores will be required using epi-illumination light source 413 (or other epi-illumination light source, not shown). Scans are repeated using different excitation wavelengths until all of the fluorophores in the specimen have been imaged, and the data acquired in each scan is added to the single-field-of-view image. Each pixel position in the final single-field-of-view image contains full colour information for each fluorophore in the specimen.

Figure 8C:
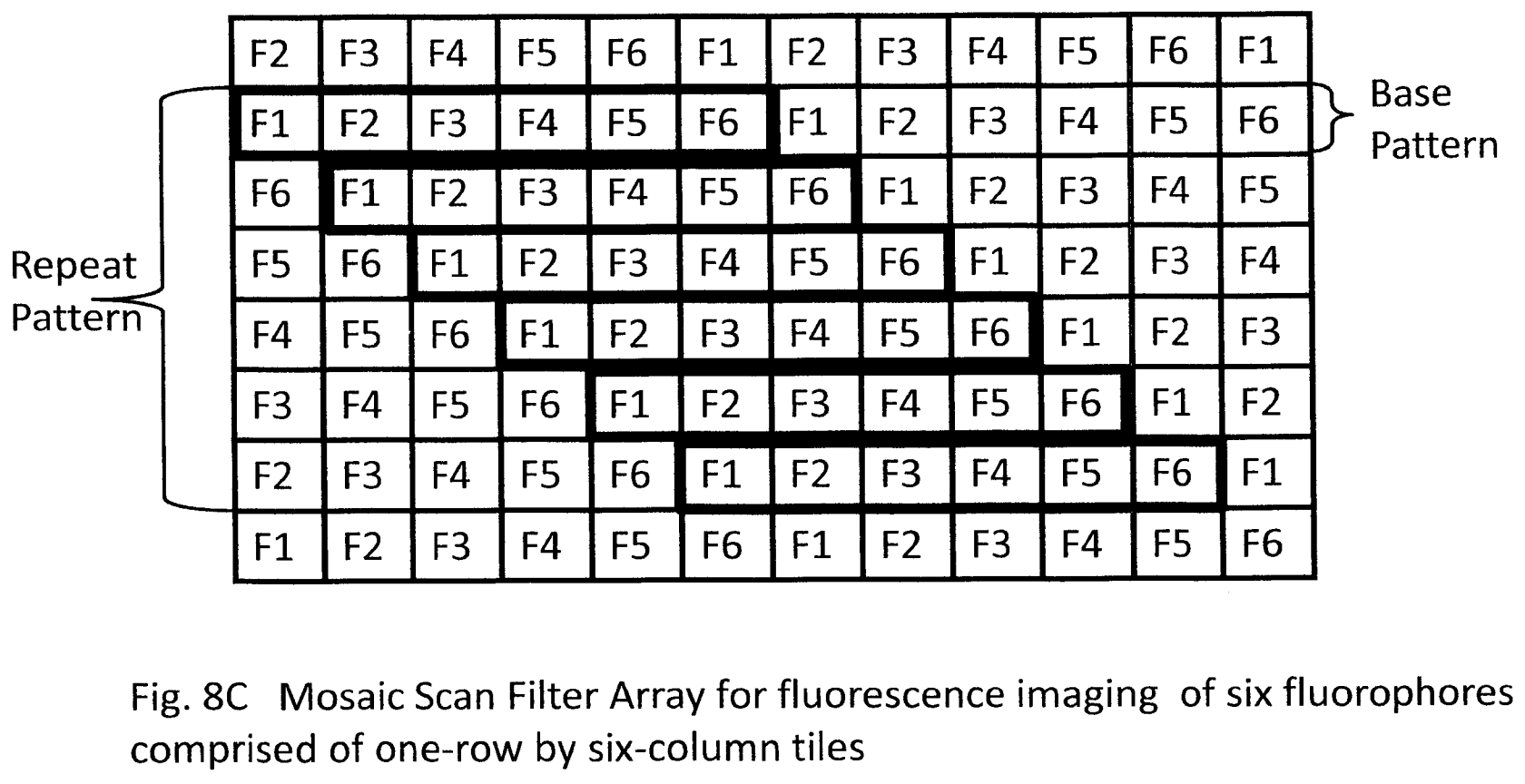

FIG. 8C shows a mosaic scan filter array for fluorescence imaging of six fluorophores comprised of one-row by six-column tiles extending across the filter array to form a base pattern. As before, each repetition of the base pattern required to form the repeat pattern is displaced laterally a distance equal to the distance between pixels in one direction relative to immediately proceeding patterns so that each column of pixels detected the tiles in each subsequent row of tiles after the first row of tiles must be displaced a distance equal to the distance between pixels along the direction of rows of pixels so that each column of pixels detected during MSIA scanning will contain all of the colours contained in the filter array. In this case, the repeat pattern must have 6 rows to ensure that each column in the MSIA image strips will contain different colour information at every pixel position, and all colours will be included. The repeat pattern has 12 columns.

When used for single-field-of-view (SFOV) scanning, the mosaic scan filter array shown in FIG. 8C covers the entire area of the detector array (and the entire array is active), and requires 6 exposures to be made in the SFOV scan to ensure that full colour data will be acquired for each pixel position in the final SFOV image, for each fluorophore. Up to 6 scans using excitation wavelengths for one or more fluorophores will be required using epi-illumination light source 413 (or other epi-illumination light source, not shown). Scans are repeated using different excitation wavelengths until all of the fluorophores in the specimen have been imaged, and the data acquired in each scan is added to the single-field-of-view image. The final single-field-of-view image contains full colour information for each fluorophore in the specimen.

FIG. 9A shows a schematic representation of a mosaic scan filter for both Hyperspectral and RGBW imaging that is a seventh embodiment of this invention. This example is a mosaic scan filter for MSIA imaging comprised of 3×3 pixel tiles that extend across the mosaic scan filter array to form a base pattern. The base pattern is repeated twice to form a repeat pattern and each repetition of the base pattern is laterally offset in one direction by one pixel width from the immediately preceding pattern. The first repetition is laterally displaced from the base pattern by one pixel width in one direction and the second repetition is laterally offset from the first repetition by one pixel width in the same direction. The repeat pattern has 9 rows and 9 columns and each column of pixels detected in the repeat pattern during MSIA scanning contains all of the colours contained in the filter array. Five of the 9 pixels in each tile of the mosaic scan area detector are covered with bandpass filters that transmit a narrow spectral range (represented in the diagram by C1, C2, C3, C4 and C5). For hyperspectral imaging, the bandwidth of each filter is the same, and the filters cover a continuous spectral range. The entire bandwidth (the continuous spectral range) of the hyperspectral filter and the number of different filters is chosen to match the application, usually covering a range of wavelengths in the visible, but sometimes including wavelengths in the near UV or the IR. Also, tiles can be designed that change the number of measured components in a spectrum. For example, a 4×3 pixel tile can be designed that contains RGBW filters as well as eight spectral filters for measuring a spectrum with eight spectral components. In this case (4×3 pixel tiles) the repeat pattern will be 12 rows. Several combinations are possible, including tiles that contain only filters for measuring the spectral components in the light reflected from, emitted by or transmitted through the specimen.

When used for both RGBW (W is a clear filter that results in a bright, panchromatic image) and hyperspectral imaging using MSIA, two scans are usually necessary to collect all of the data. A first scan is used to collect RGBW data, with transmission illumination provided by white light source 410 or using reflected light from epi-illumination source 413. Data collected during this scan is stored in four strip images, one each for R, G, B and W. The computer has access to all of the image data in each frame image collected during the MSIA scan process, and can record data from the RGBW channels while not recording data from the spectral channels during the first scan. A second scan acquires data from spectral channels that are excited by the illumination wavelengths chosen to illuminate the specimen for the second scan. As the second scan proceeds, the computer acquires data and sets up strip images collected by detector pixels covered by transmission filters that transmit the narrow spectral bands that together cover a continuous spectral range. When a strip image containing the spectrum composed of narrow spectral bands over a continuous spectral range has been acquired, a final strip image of the specimen is assembled that contains R, G, B and W information and spectral information for each pixel position in that strip across the specimen. Stage 405 is then moved to the start position to for a second strip across the specimen, and the sequence of scans is repeated to collect R, B, G and W information and spectral intensity for a second strip image. Finally, all of the combined brightfield and spectrally-resolved strip images are assembled to produce an image of the specimen that contains R, B, G and W as well as Spectral intensity information for every pixel position in the scanned area of the specimen.

When used for single-field-of-view scanning, the mosaic scan filter array covers the entire area of the detector array, and the entire array is active. The mosaic scan filter array shown in FIG. 9A requires 9 exposures to be made in an SFOV scan to ensure that data from each filter colour present in a mosaic tile will be acquired for each pixel position in the final SFOV image. After the first 9 exposures are completed using white light source 410 to acquire R, G, B and W data, the specimen is moved back to the start position and the stage is moved to acquire an additional 9 exposures using epi illumination or reflected-light illumination to acquire data describing the spectrum of light transmitted through or reflected from the specimen, using pixels covered by filters C1 through C5 (in the filter array described in FIG. 9). The final single-field-of-view image contains full colour information for each pixel (R, G, B, W plus information on the spectrum of light reflected from or transmitted through the specimen).

FIG. 9B shows a mosaic scan filter array for hyperspectral imaging comprised of three-row by three-column tiles that extend across the mosaic scan filter array to form a base pattern. There is a first repetition and a second repetition of the base pattern with each repetition being laterally offset in one direction by one pixel width. The first repetition is laterally offset from the base pattern and the second repetition is laterally offset from the first repetition. The repeat pattern has 9 rows and 9 columns with each column of pixels detected during MSIA scanning containing all of the colours contained in the filter array. The mosaic scan filter array covers at least the active area of the detector array. When used for MSIA scanning for hyperspectral imaging as shown in FIGS. 4 and 5, the specimen is illuminated using a wavelength or range of wavelengths appropriate for the measurement being made. The spectrum of light transmitted through, reflected by or emitted from the specimen (depending on the illumination source in use) is detected during the MSIA scan, a strip image for each spectral component is collected and assembled in computer memory, and the single-colour strip images are combined by the computer to produce a final strip image in which every pixel position contains colour image data for each of the nine colour filters in the array. As an example, if this filter array (3×3 tiles and a repeat pattern of 9 rows) is used with a detector array active area of 54 rows, then each of the 9 colours at each pixel position in the final image will have been measured 6 times, with a resulting increase in signal/noise ratio equal to the square root of 6 (approximately 2.45).

When used for single-field-of-view scanning, the mosaic scan filter array covers the entire area of the detector array, and the entire array is active. The mosaic scan filter array shown in FIG. 9B requires 9 exposures to be made in an SFOV scan to ensure that data from each narrow spectral band filter in a mosaic tile will be acquired for each pixel position in the final SFOV image. The final single-field-of-view image contains full colour information (C1 through C9) at each pixel position.

FIG. 9C shows a mosaic scan filter array for hyperspectral imaging comprised of one-row by six-column tiles that extend across the mosaic scan filter array to form a base pattern. The base pattern is repeated five times to form a repeat pattern, the repeat has 6 rows and 12 columns. The mosaic scan filter array covers at least the active area of the detector array. When used for MSIA scanning for hyperspectral imaging as shown in FIGS. 4 and 5, the specimen is illuminated using a wavelength or range of wavelengths appropriate for the measurement being made. The spectrum of light transmitted through, reflected by or emitted from the specimen (depending on the specimen and the illumination source in use) is detected during the MSIA scan, a strip image for each spectral component is collected and assembled in computer memory, and the single-colour strip images are combined by the computer to produce a final strip image in which every pixel position contains colour image data for each of the six colour filters in the array. As an example, if this filter array (1×6 tiles and a repeat pattern of 6 rows) is used with a detector array active area of 54 rows, then each of the 6 colours at each pixel position in the final image will have been measured 9 times, with a resulting increase in signal/noise ratio of the square root of 9 (a S/N increase of a factor of 3).

When used for single-field-of-view scanning, the mosaic scan filter array covers the entire area of the detector array, and the entire detector array is active. The mosaic scan filter array shown in FIG. 9C requires 6 exposures to be made in an SFOV scan to ensure that data from each narrow spectral band filter present in a mosaic tile will be acquired for each pixel position in the final SFOV image. The stage is moved to acquire 6 exposures to acquire data describing the spectrum of light transmitted through, reflected by or emitted from the specimen, using pixels covered by filters C1 through C6 (in the filter array described in FIG. 9C). The final single-field-of-view image contains full colour information for each pixel (R, G, B, W plus information on the spectrum of light reflected from or transmitted through the specimen).

Mosaic scan filter arrays with single-row tiles are very easy to design-If nine spectrum components are required, for example, each tile contains nine transmission filters that transmit narrow spectral bands that together cover a continuous spectral range. In this case, the base pattern is still one row, but the repeat pattern is nine rows. More generally, if a spectral range requires M narrow spectral band filters, each single-row tile contains M filters and the repeat pattern is M rows.

It is also possible to design a mosaic scan filter array which contains two different continuous spectral ranges. This is particularly easy when designing single-row tiles, where the filter sets comprising the two different continuous spectral ranges are placed side-by-side in each single-row tile. In this example, the base pattern is still one row, but the repeat pattern is the number of rows that is equal to the sum of the number of filters in the two filter sets.

Some applications for mosaic scan filter arrays designed for hyperspectral imaging.

One common application of mosaic scan filter arrays designed for hyperspectral imaging is photoluminescence imaging of semiconductor materials and devices. In this case, the specimen is usually epi-illuminated with UV light, and a detector array covered with a hyperspectral mosaic scan filter array is used for MSIA or SFOV imaging to acquire spectrally-resolved photoluminescence images of the specimen.

It is also possible to use mosaic scan filter arrays designed for hyperspectral imaging for imaging fluorescent specimens. In this case, the specimen is epi-illuminated with short wavelength light (often UV) and a spectrally-resolved image of the fluorescence from the specimen is collected using MSIA or SFOV scanning. Since the emission spectra of common fluorophores are well known, the overlapping spectra can be deconvolved using data in the spectrally-resolved image.

FIG. 10 shows a schematic representation of an MSIA scanner for spectrally-resolved imaging that can also acquire Single-Field-of-View images using a mosaic spectral imaging scan filter like those described in this document (designed for multi-spectral or hyperspectral imaging and sometimes including R, G and B and/or W rows) that is an eighth embodiment of this invention. Detector array 411 with spectral imaging scan filter 1015 is mounted on a scanning stage 1020 inside digital camera 1030. In this embodiment, during MSIA scanning stage 1020 is held in a fixed position while computer 1060 controls scanning of stage 405 in a direction shown by the horizontal left-right arrow to the left of stage 405. This scan direction is perpendicular to the rows in detector array 411. During MSIA scanning, an active area is defined in detector array 411 and data is passed to computer 1060 to assemble MSIA strip images (one for each filter colour in the mosaic scan filter array) as described earlier.

When a feature of interest has been identified in the scanned MSIA image, scanning stage 405 is controlled by computer 1060 to move the feature of interest to the centre of the field of view of microscope objective 415, and scanning stage 405 is held stationary at this position. At this position, an image of the portion of the specimen inside the field of view of the microscope optics is projected onto detector array 411 that is covered by a mosaic scan colour filter array 1015. A spectrally-resolved image of that portion of the specimen can be acquired as follows: With scanning stage 405 held in a stationary position, and using the entire area of the detector array as an active area, an image of the specimen is acquired by opening and closing the shutter. This image contains rows of data that match the rows of the mosaic scan filter array, repeated across the whole field of view of the microscope. Using the same spectral imaging scan filter that was used in the description of the instrument shown in FIG. 10 as an example, a first frame image is acquired and transferred to the nine image frames required for a 3×3 pixel filter. In this case, instead of moving the specimen on a stage mounted on scanning stage 405, the detector array 411 covered with mosaic spectral imaging scanning colour filter array 1015 is moved a distance equal to the distance between rows of detector pixels in the array to a new position where a second frame image is acquired and passed to computer 1060. The difference between the instrument shown in FIG. 10 and that shown in FIG. 5 is that in the instrument shown in FIG. 10 the specimen is stationary during Single-Field-of-View scanning, but the detector array moves, while in FIG. 5 the specimen moves and the detector array is stationary. Otherwise, image frame data is collected and image frames are assembled in the same way in the two instruments through relative motion of the image of the specimen and the detector array. When using a 3×3 pixel mosaic scan colour filter array like that shown in FIG. 8, after nine steps a single frame image of the specimen is complete using R, G, B and W colour transmission filters, and after changing the illumination source and returning the stage 1020 to its start position, a further 9 steps are required to collect spectrally-resolved information for the five remaining filters in the mosaic scan filter array. The final result is a high resolution RGBW and spectral image of the field of view of the microscope objective, with full colour information at each pixel position in the image.

For this example, we use the same specifications for a scanning microscope as was discussed earlier in this document ("actual pixel" resolution 0.25 microns, 20× microscope objective with a Numerical Aperture of 0.75 or larger, and a detector array having 5 micron pixels). When performing Single-Field-of-View scanning using this combination of microscope objective and detector array, and using scanning stage 1020 to move detector array 411 instead of moving the specimen as in the previous example, each step motion of stage 1020 is 5 microns, and for very high resolution imaging the accuracy and repeatability of motion should be better than .5 microns, which is a not nearly as stringent a requirement as before. The range of motion is larger than before, because for a large Repeat Patterns of 256 rows, the range of stage motion required is 1280 microns, or 1.28 mm. Several types of motorized stages meet these requirements, including piezoelectric stages and stages with linear motors, stepping motors and others. Moving the stage to the next position, stopping and exposing an image while the detector array is stationary will provide the best resolution, but it is also possible to move the stage at constant speed, opening and closing the shutter and transferring image data to the computer in the time it takes for the stage to move a distance less than the distance between pixels (5 microns in this example), but this may result in some motion blur in the image.

Moving the detector array instead of moving the specimen when acquiring Single-Field-of-View scanned images has several advantages. First, the requirements for motion of the detector and repeatability are much less stringent than for moving the specimen, so several choices are available for moving stages and cost for the stage will be less. Second, because the available stages have better specifications than the minimum required, performance will likely be more robust over time.

Note: An alternative method of moving the detector array with respect to the stationary image when acquiring single-field-of-view scanned images is to mount digital camera 430 onto a moving stage that is external to the camera, instead of placing the moving stage 1020 inside the camera 1030.

FIG. 11 shows a schematic representation of an digital scanning Single-Field-of-View camera 1101 for use on a microscope (or other optical instrument where single-field-of-view images are acquired) that acquires Single-Field-of-View images using a mosaic spectral imaging scan filter like those described in this document (designed for multi-spectral or hyperspectral imaging and sometimes including R,G and B and/or W rows) where the detector array 411 with spectral imaging scan filter 1010 is mounted on a scanning stage 1020 inside digital camera 1030 which is a ninth embodiment of this invention. Computer 1160 is programmed to control scanning stage 1020 through wired or wireless connection 1040, acquire frame images using frame grabber 1050, and as the scan proceeds, assemble frame images for each filter in the repeat pattern, and when the scan is complete to display these spectrally-resolved images on a computer monitor. It is expected that this scanning Single-Field-of-View camera, including the computer and frame grabber, can be assembled as a single package that can be mounted directly on the camera port of a microscope or other optical instrument.

FIG. 12 shows a schematic representation of a microscope with digital Single-Field-of-View camera attached. Microscope specimen 402 on microscope slide 401 is mounted on manual X-Y positioning microscope stage 1201 and is illuminated by transmission light source 410 or epi-illumination source 413, as required. Light emitted by or reflected from specimen 402 is collected by microscope objective 415 which is focused on the specimen by manual focus mount 1220 and this light is focused on detector array 411 which includes a mosaic spectral-imaging scan filter 1015. The specimen can be viewed through the microscope's eyepieces (not shown) for focusing and to find a feature of interest to display, or the digital scanning Single-field-of-view camera can be programmed to continuously display images of the specimen on a computer monitor while focusing and finding an area of interest on the specimen. When the instrument is focused on the area of interest, computer 1160 can be programmed to display a spectrally-resolved image of the specimen, as well as registered RGB and Greyscale images of the same area (depending on which mosaic spectral-imaging scan filter is present on detector array 411). Scanning Single-Field-of-View camera 1101 enables this basic microscope to be used for RGB and/or Greyscale and multi-fluorophore imaging, or RGB and/or Greyscale and hyperspectral imaging, depending on which mosaic spectral-imaging scan filter is present on detector array 411, and each of these combinations can be achieved using only one camera, and all images are perfectly registered with each other.

I claim:

1. A scanning microscope for obtaining an image of at least a portion of a large microscope specimen, the microscope comprising:
   a) an illumination system to illuminate a part of the specimen being scanned;
   b) at least one lens that focuses light from the specimen onto a two dimensional detector array, the specimen being mounted on a support that is movable relative to the two dimensional detector array;
   c) a motion of the support relative to the detector array being controlled by a computer, the motion of the support relative to the detector array being in a direction perpendicular to rows of the two dimensional detector array;
   d) the two dimensional detector array having a mosaic scan filter array with a plurality of identical tiles, each tile having a plurality of filters arranged in:
   at least one row that is perpendicular to a scan direction; and
   at least two columns that are parallel to the scan direction, wherein at least one row of each tile has two or more different filters in that row, the plurality of tiles being arranged to cover at least an active area of the detector array in at least:

i) a first row of tiles that is perpendicular to the scan direction;
ii) a second row of tiles that is also perpendicular to the scan direction; and
iii) additional rows of tiles that are also perpendicular to the scan direction, wherein:
the tiles of the second row of tiles are laterally offset from the tiles of the first row of tiles by one pixel width of the detector in a direction perpendicular to the scan direction and tilers of each additional row of tiles are also laterally offset by one pixel width from tiles of a previous row of tiles in the direction perpendicular to the scan direction such that neither interpolation or demosaicing is required to produce one or more final images and data from each filter colour is measured at each image pixel position of the one or more final images;

e) a computer to control the detector array to capture sequential substantially overlapping frame images of the specimen each time that an optical image of the specimen is moved a distance relative to the detector array that is equal to the distance between adjacent rows of the detector array, image data from each frame image translated into computer memory to match a motion of an optical image across the detector array and added to or averaged with any data previously stored in that pixel position to generate an image of a strip across the specimen, the computer capturing of frame images continuing until the specimen is moved a relative distance where all object points in that strip have been exposed a number of times equal to a chosen number of active rows in the detector array, there being one strip generated from each distinctive colour of the mosaic scan filter array; and f) the one or more final images of the specimen resulting from the portion of the specimen scanned.

2. The scanning microscope as claimed in claim 1 wherein the computer is programmed to control relative movement between the detector array and the specimen, the detector array acquiring multiple frame images of the specimen which are added to or averaged with any data previously stored to generate the one or more final images of the specimen, each pixel of the one or more final images containing information from each distinctive colour of the mosaic scan filter such that the final image has full colour information in each pixel.

3. The scanning microscope of claim 1, wherein each tile of the plurality of tiles is a 4×4 tiles, each 4×4 tile containing four 2×2 tiles that are identical to one another.

4. The scanning microscope of claim 1, wherein each tile of the plurality of tiles is a 3×3 tile.

5. The scanning microscope as claimed in claim 4 wherein each 3×3 tile of the mosaic scan filter array has one red filter, one green filter, one blue filter, one white filter, the white filter being a clear filter, a first fluorescence emission filter, a second fluorescence emission filter, a third fluorescence emission filter, a fourth fluorescence emission filter, and a fifth fluorescence emission filter.

6. The scanning microscope as claimed in claim 4 wherein each 3×3 tile of the mosaic scan filter array has one red filter, one green filter, one blue filter, one white filter, the white filter being a clear filter, a first narrow spectral band filter, a second narrow spectral band filter, a third narrow spectral band filter, a fourth narrow spectral band filter and a fifth narrow spectral band filter, where the five narrow spectral band filters cover a continuous spectral range.

7. The scanning microscope as claimed in claim 1 wherein each identical tile has MxN filters selected from the group of one or more red filters, green filters, blue filters, white filters, the white filters being clear filters, fluorescence emission filters and narrow spectral band filters covering a continuous spectral range.

8. The scanning microscope as claimed in claim 1 where each identical tile has MxN filters selected from the group of one or more red filters, green filters, blue filters, white filters, any white filters being clear filters and either one or more fluorescence emission filters or narrow spectral band filters covering one or more continuous spectral ranges.

9. A scanning microscope for obtaining an image of a single-field-of-view of microscope optics comprising:
a) an illumination system to illuminate a part of the specimen being scanned;
b) an at least one lens that focuses light from the specimen onto a two dimensional detector array, the specimen being mounted on a support that is movable relative to a two dimensional detector array;
c) a motion of the support relative to the detector array being controlled by a computer, the motion of the support relative to the detector array being in a direction perpendicular to rows of the two dimensional detector array;
d) the two dimensional detector array having a mosaic scan filter array with a plurality of identical tiles, each tile having a plurality of filters arranged in:
at least one row that is perpendicular to a scan direction; and
at least two columns that are parallel to the scan direction,
wherein at least one row of each tile has two or more different filters in that row, the plurality of tiles being arranged to cover at least an active area of the detector array in at least:
a first row of tiles that is perpendicular to the scan direction;
a second row of tiles that is also perpendicular to the scan direction; and
additional rows of tiles that are also perpendicular to the scan direction,
wherein:
the tiles of the second row of tiles are laterally offset from the tiles of the first row of tiles by one pixel width of the detector array in a direction perpendicular to the scan direction and each additional row of tiles is also laterally offset by one pixel width from a previous row of tiles in the direction perpendicular to the scan direction such that neither interpolation or demosaicing is required to produce a final image and data from each filter colour is measured at each image pixel position of the final image; and
each filter is selected from a group of one or more of the following: red filters, green filters, blue filters, white filters, any white filters being clear filters, fluorescence emission filters and a series of narrow spectral band filters covering a continuous spectral range; and
e) a computer to control the detector array to capture sequential substantially overlapping frame images of the specimen each time that an optical image of the specimen is moved a distance relative to the detector array that is equal to the distance between adjacent rows of the detector array, the computer capturing n frame images, image data from each frame image translated into computer memory to match a motion of the optical image across the detector array and added to any data previously stored to generate a single-frame image of the specimen, each pixel of the final single-frame image containing information from each distinctive colour of the mosaic scanning filter such that the final single-field-of-view image has full colour information in each pixel.

10. A scanning camera for obtaining an image of a single-field-of-view of an optical system comprising:
a) an illumination system to illuminate a part of the specimen being scanned;
b) at least one lens that focuses light from the specimen onto a two dimensional detector array, the two dimensional detector array being mounted on a support that is movable relative to a specimen being imaged;
c) a motion of the support of the detector array being controlled by a computer, the motion of the support relative to the specimen being in a direction perpendicular to rows of the two dimensional detector array;
d) the two dimensional detector array having a mosaic scan filter array with a plurality of identical tiles, each tile having a plurality of filters arranged in:
at least one row that is perpendicular to a scan direction; and
at least two columns that are parallel to the scan direction,
wherein at least one row of each tile has two or more different filters in that row, the plurality of tiles being arranged to cover at least an active area of the detector array in at least:
a first row of tiles that is perpendicular to the scan direction;
a second row of tiles that is also perpendicular to the scan direction; and
additional rows of tiles that are also perpendicular to the scan direction,
wherein:
the tiles of the second row of tiles are laterally offset from the tiles of the first row of tiles by one pixel width of the detector array in a direction perpendicular to the scan direction and each additional row of tiles is also laterally offset by one pixel width from a previous row of tiles in the direction perpendicular to the scan direction such that neither interpolation or demosaicing is required to produce a final image and data from each filter colour is measured at each image pixel position of the final image; and
each filter is selected from a group of one or more of the following: red filters, green filters, blue filters, white filters, any white filters being clear filters, fluorescence emission filters and a series of narrow spectral band filters covering a continuous spectral range; and
e) a computer to control the detector array to capture sequential substantially overlapping frame images of the specimen each time that the detector array is moved a distance that is equal to the distance between adjacent rows of the detector array, the computer capturing n frame images in sequence, image data from each frame image translated in computer memory to match a motion of the optical image across the detector array and added to any data previously stored to generate a single-frame image of the specimen, each pixel of the final single-frame image containing information from each distinctive colour of the mosaic scan filter array such that the final single-field-of-view image has full colour information in each pixel.

11. A method of using a mosaic scan filter array with one or more of a scanning microscope and a scanning camera, the scanning microscope or scanning camera having:
a) an illumination system to illuminate a part of the specimen being scanned;
b) at least one lens that focuses light from the specimen onto a two dimensional detector array, the specimen being mounted on a support that is movable relative to a two dimensional detector array;
c) a motion of the support relative to the detector array being controlled by a computer, the motion of the support relative to the detector array being in a direction perpendicular to rows of the two dimensional detector array;
d) the two dimensional detector array having a mosaic scan filter array with a plurality of identical tiles, each tile having a plurality of filters arranged in:
at least one row that is perpendicular to a scan direction; and
at least two columns that are parallel to the scan direction,
wherein at least one row of each tile has two or more different filters in that row, the plurality of tiles being arranged to cover at least an active area of the detector array in at least:
a first row of tiles that is perpendicular to the scan direction;
a second row of tiles that is also perpendicular to the scan direction; and
additional rows of tiles that are also perpendicular to the scan direction,
wherein:
the tiles of the second row of tiles are laterally offset from the tiles of the first row of tiles by one pixel width of the detector array in a direction perpendicular to the scan direction and each additional row of tiles is also laterally offset by one pixel width from a previous row of tiles in the direction perpendicular to the scan direction such that neither interpolation or demosaicing is required to produce one or more final images and data from each filter colour is measured at each image pixel position of the one or more final images; and
each filter is selected from a group of one or more of the following: red filters, green filters, blue filters, white filters, any white filters being clear filters, fluorescence emission filters and a series of narrow spectral band filters covering a continuous spectral range; and
e) a computer to control the detector array to capture sequential substantially overlapping frame images of the specimen each time that an optical image of the specimen is moved a distance relative to the detector array that is equal to the distance between adjacent rows of the detector array, image data from each frame image translated into computer memory to match a motion of an optical image across the detector array and added to or averaged with any data previously stored to generate an image of a strip across the specimen, the computer capturing of frame images continuing until the specimen is moved a relative distance where all object points in that strip have been exposed a number of times equal to a chosen number of active rows in the detector array, there being one strip generated from each distinctive colour of the mosaic scan filter array, which comprises passing light from a specimen through said mosaic scan filter array to said detector array;

the method comprising activating the scanning microscope or scanning camera to obtain the one or more final images of the specimen resulting from the portion of the specimen being scanned, each pixel of the one or more final images containing information from each of the distinctive colours of the mosaic scan filter array, which comprises passing light from a specimen through said mosaic scan filter array to said detector array.

\* \* \* \* \*